(12) United States Patent
Bureau et al.

(10) Patent No.: US 8,394,460 B2
(45) Date of Patent: Mar. 12, 2013

(54) METHOD FOR MASK-FREE LOCALIZED ORGANIC GRAFTING ON CONDUCTIVE OR SEMICONDUCTIVE PORTIONS OF COMPOSITE SURFACES

(75) Inventors: Christophe Bureau, Suresnes (FR); Serge Palacin, Montigny le Bretonneux (FR); Jean-Philippe Bourgoin, Voisins le Bretonneux (FR); Sami Ameur, Gif sur Yvette (FR); Julienne Charlier, Gif sur Yvette (FR)

(73) Assignee: Commissariat a l'Energie Atomique, Paris (FR)

( * ) Notice: Subject to any disclaimer, the term of this patent is extended or adjusted under 35 U.S.C. 154(b) by 795 days.

(21) Appl. No.: 10/614,516

(22) Filed: Jul. 8, 2003

(65) Prior Publication Data
US 2004/0082120 A1    Apr. 29, 2004

Related U.S. Application Data

(63) Continuation of application No. PCT/FR02/00726, filed on Feb. 28, 2002.

(30) Foreign Application Priority Data

Mar. 2, 2001    (FR) ..................... 01 02882

(51) Int. Cl.
*B05D 1/04* (2006.01)
*B05D 3/02* (2006.01)
(52) U.S. Cl. .................... 427/458; 427/384
(58) Field of Classification Search .............. None
See application file for complete search history.

(56) References Cited

U.S. PATENT DOCUMENTS

| | | | | |
|---|---|---|---|---|
| 4,269,682 A | * | 5/1981 | Yano et al. | 204/418 |
| 5,168,321 A | * | 12/1992 | Gregory et al. | 356/139.06 |
| 5,196,257 A | | 3/1993 | Barraud et al. | |
| 5,350,323 A | * | 9/1994 | Boissel et al. | 439/886 |
| 5,766,934 A | * | 6/1998 | Guiseppi-Elie | 435/287.9 |
| 5,804,709 A | | 9/1998 | Bourgoin et al. | |
| 6,365,491 B1 | | 4/2002 | Martin et al. | |
| 6,517,858 B1 | | 2/2003 | Le Moel et al. | |
| 2003/0149122 A1 | | 8/2003 | Bureau et al. | |

FOREIGN PATENT DOCUMENTS

| | | |
|---|---|---|
| EP | 0 449 226 A1 | 10/1991 |
| JP | 61 163659 A | 7/1986 |
| WO | WO 03/018212 | 3/2003 |

OTHER PUBLICATIONS

Charlier et al., Journal of Electroanalytical Chemistry 465:200-208 (1999).*
Yoshimi et al., Surface modifications of functional electrodes of a light addressable potentiometric sensor (LAPS): non-dependency of pH sensitivity on the surface functional group, Materials Science and Engineering C 5 (1997) 131-139.*
Zelenay et al., Adsorption of Pyridine on Polycrystalline Gold Electrode Studied by Radioactive-Labeling Method, Langmuir 1990, 6, 974-979.*
Ma et al., Potential-Assisted Deposition of Alkanethiols on Au: Controlled Preparation of Single- and Mixed-Component SAMs, Langmuir 2000, 16, 6188-6190.*
U.S. Appl. No. 10/544,651, filed Aug. 5, 2005, Bureau, et al.

* cited by examiner

*Primary Examiner* — James Ketter
*Assistant Examiner* — Reza Ghafoorian
(74) *Attorney, Agent, or Firm* — Oblon, Spivak, McClelland, Maier & Neustadt, L.L.P.

(57) ABSTRACT

A process for mask-free localized grafting of organic molecules capable of being electrically activated, onto a composite surface comprising conductive and/or semiconductive portions, by placing said organic molecules in contact with said composite surface, in which said grafting is performed electrochemically in a single step on chosen, defined areas of said conductive and/or semiconductive portions, said areas being brought to a potential higher than or equal to a threshold electrical potential determined relative to a reference electrode, said threshold electrical potential being the potential above which grafting of said organic molecules takes place.

24 Claims, 15 Drawing Sheets

METHOD FOR MASK-FREE LOCALIZED ORGANIC GRAFTING ON CONDUCTIVE OR SEMICONDUCTIVE PORTIONS OF COMPOSITE SURFACES

BACKGROUND OF THE INVENTION

1. Field of the Invention

The present invention relates to a process, in particular a mask-free one-step process, for localized functionalization of conductive or semiconductive portions of composite surfaces with organic coatings, or alternatively to a process of mask-free localized organic grafting onto conductive or semiconductive portions of composite surfaces.

2. Discussion of the Background

There are at the present time four means identified for producing this type of localized organic grafting:
  (i) Electronic or photochemical addressing with radiation[1].
  (ii) Electrovaporization with masking[2].
  (iii) Mechanical addressing by micropipetting and automatic distribution[3].
  (iv) Two-dimensional electrophoretic addressing[4].
  (v) The microcontact printing technique[5].

The point that processes (i) to (v) have in common is that they can be broken down into:
  a paving, certain areas of which it is desired to cover with an organic coating;
  a method for triggering the manufacture of chemical bonds between the organic molecules and the surface. This involves, respectively: (i) a beam of particles (photons, electrons or ions); (ii) to (v) chemisorption or physisorption reactions;
  a "masking" process, responsible for the localization, which makes it possible to govern the fact that the triggering method will act on one given area of the paving and not on another. This involves, respectively: (i) focussing the beam; (ii) a physical mask; (iii) mechanical positioning of a tip or a nozzle; (iv) the two-dimensional protocol for placing under potential; (v) resolution of the etching on the ink pad and of the "flash" of the fluids printed on this etching.

In all these processes, only the masking phase is responsible for the localization obtained. In particular, this phase is independent of the topology of the paving that it is desired to dress: specifically, assuming that it is the same paving that it is desired to cover in places by these various processes: added to the complexity of manufacturing the paving is the complexity of the localization (or "masking") process, which usually requires a complex development and apparatus. Neither the agent triggering the chemical reaction for surface functionalization nor the localization offered by the paving before intervention participate in the efficacy of the localization: in process (i), the triggering agent is the beam of particles (photons, electrons or ions), optionally guided by a mask (see, in this respect, document U.S. Pat. No. 3,271,180 (1966)); in process (ii), the triggering agent (non-localized) is polarization of the substrate on which react molecules spatially filtered by a mask: the mask ensures the localization; in process (iii), the triggering factor is again polarization of the substrate, and the localization arises from the fact that the molecules are deposited by micropipetting at the bottom of a small trough etched into the substrate, and made conductive by depositing gold; in process (iv), the molecules are guided by gel electrophoresis to the desired area, and then fixed via a chemical reaction in the gel (using a reagent which constitutes the triggering agent).

In all these processes, the spatial resolution of the grafting is thus that of the "masking" process: it does not exploit to the maximum the geometrical guide already offered by the paving.

An additional point in common in processes (ii) to (v) is that the localization of the organic material thereon is based on a physical displacement of the molecules to be grafted, which is guided as much as possible. The intrinsic resolution of the process is then linked to the control of the method for displacing the molecules: resolution of the mask for (ii), lateral resolution of the mechanical displacements of micronozzles for (iii), protocol for placing under potential to counteract the effects of local diffusion and of broadening of the spots in (iv), etc.

The published patent application EP-A1-0 774 662 (1996) describes the production of a topology for addressing conductive individual plots on a semiconductive surface, which is not the subject of the present invention, since it is assumed that the paving exists, and that it is precisely on this paving that functionalizations are produced. Said patent application mentions its possible use for the local production of electrochemical reactions. As for process (i), this involves a means for locally obtaining an agent for triggering reactions, in this case electrochemical reactions, by selective polarization of an area of the paving, but the complexity of the localization method and of the triggering agent amount to the complexity of producing the paving: it is the paving itself that is supposed to ensure the localization. However, said patent application does not mention specific electrochemical reactions or localized functionalizations. It is thus also a process in which the localization may be obtained by selecting the polarized area, by multiplexing, the support assembly, comprising all the contactable areas, being dipped in the electrochemical bath. In the patents related to process (iii)[3], it is mentioned, however, that this method of individual addressing with multiplexing is an impediment to the application on dense etchings, due to the complexity and furthermore the multiplexing.

The current lateral resolution of organic deposits obtained by processes (i)-(iv) is of the order of a few tens to about a hundred microns. This barrier is found everywhere, for various reasons: focussing and chemical stability in the area of grafting for (i), precision of the masking effects for (ii), control of the mechanical displacements of the large-scale high-resolution nozzles for (iii), diffusion and broadening of the plots in the gel, during migration, for (iv). The process of localized addressing by multiplexing appears in principle to be limited only by the current resolution of microelectronics (i.e. a few tenths of a micrometer), but no functionalization process associated with this addressing has been described, to our knowledge. The technique of microcontact printing[5] (v) has a resolution of the order of 100 nm on a flat surface. It is not described on a surface structured with paving.

The information regarding the stability of the graft delivering the primary functionalization obtained by processes (i)-(iv) is not all available. However, it may be noted that process (iii), which uses the growth of conductive polymers, does not allow a solid graft on the surface. As is recalled hereinbelow, the electropolymerization of monomers that are precursors of conductive polymers is a mechanism in which the growth of the polymer takes place in solution, and is followed by precipitation of the polymer on the surface: this precipitation generally does not give rise to interface chemical bonds, and delivers functionalization on the surface, but not functionalization of the surface. The process described in the reference in point (v) (WO-A-96 29629) involves an Au—S covalent bond, but which is not obtained on preexisting paving, and which is found to be weaker than the bonds manufactured by the present process.

In summary, the processes of the prior art have the following drawbacks:

- since the masking phase conventionally used to perform organic grafting onto a mineral surface is responsible for the localization obtained, the spatial resolution of the graft is that of the masking process. It is thus at best of the order of the current resolutions of microelectronics. Moreover, the localization of the organic material is based on a physical displacement of the molecules to be grafted, which is guided as much as possible. The intrinsic resolution of the process is thus also linked to controlling the field of displacement of the molecules;
- several operating steps are necessary: most of the known methods which pursue the same objective proceed via masking; via preliminary, geographically selective physical displacement of molecules, or physicochemical activation which is intrinsically localized, but independent of the resolution of the paving, and then finally by grafting;
- the metal-molecule bonds manufactured are found to be relatively weak.

SUMMARY OF THE INVENTION

The aim of the present invention is to provide a process for obtaining localized functionalization, for example, on preexisting paving, while overcoming and solving the problems posed by the processes of the prior art, especially as regards the resolution of the masking phase, and the strength of attachment of the coating.

This aim and others are achieved in accordance with the invention by a process for mask-free localized grafting of organic molecules capable of being electrically activated, onto a composite surface comprising conductive and/or semiconductive portions, by placing said organic molecules in contact with said composite surface, in which said grafting is performed electrochemically in a single step on chosen, defined areas of said conductive and/or semiconductive portions, said areas being brought to a potential higher than or equal to a threshold electrical potential determined relative to a reference electrode, said threshold electrical potential being the potential above which grafting of said organic molecules takes place.

Preferably, the composite surface consists of a paving of materials made of different matter.

Advantageously, said organic molecules are chosen from electropolymerizable molecules and electrocleavable molecules.

Advantageously, said electrocleavable molecules are chosen from diazonium salts, phosphonium salts, sulfonium salts, carboxylic acid salts, aryl acetates, aliphatic alcohols and amines.

Preferably, said electropolymerizable molecules are chosen from the vinyl monomers of formula B—R-A, in which R is a group bearing a vinyl double bond, A is an electron-withdrawing or electron-donating functional group, and B is any functional group, for example a group bearing a function that it is desired to give to the final polymer obtained from said monomers; the molecules comprising at least one strainedring; the functionalized monomers derived from said monomers and molecules; and mixtures of said monomers and molecules.

Advantageously, said composite surface is a surface of silicon and gold or of silicon dioxide and gold.

The present invention makes it possible to obtain localized functionalization, for example on a preexisting paving of materials of different nature, while overcoming and solving the problems posed by the techniques of the prior art, in particular, for example:

- the process of the invention allows localization of the coating with a resolution that is dictated by all or some of the pattern of the original paving (the selectivity is mainly achieved by adjusting the electrical potential—measured relative to a reference electrode—applied to the chosen area). The resolution obtained is negligible compared with that of microelectronics;
- the process is performed in a single step. The regioselectivity of the attachment is obtained via the grafting reaction itself. The cost of implementation of the process is thus reduced;
- the strength of attachment of the coating is unparalleled.

According to the invention, specifically, the functionalization is obtained by electrografting electro-activatable molecules, capable of delivering a layer of molecules or of macromolecules, grafted onto the surface via interface chemical bonds.

Electrocleavable molecules (for instance diazonium salts, phosphonium salts or sulfonium salts, aryl acetates, aliphatic alcohols and amines) or monomers delivering polymers that are intrinsically insulating (but which may become conductive by post-treatment), for instance vinyl monomers or molecules with a strainedring, are examples of possible candidates.

According to the invention, when a macroscopic surface consists of a paving of materials of different nature, the grafting onto certain chosen areas of the paving, with the exclusion of others, is thus achieved even though all of the macroscopic surface has been dipped in the electrolysis solution.

The selectivity is achieved mainly by adjusting the electrical potential—measured relative to a reference electrode—applied to the chosen area; for this reason, the selectivity is obtained irrespective of the area of the paving in which the electrical contact has been physically installed. The expression materials "of different nature" thus means materials which differ, for example, in at least one of the following parameters: electronic work function under vacuum, salvation of the surface by the electrolysis solvent, Brönsted acidity in the electrolysis solvent.

This localized one-step grafting represents a significant innovation for the selective functionalization of composite surfaces.

Firstly, as is described hereinbelow, the regioselectivity of attachment is obtained by the grafting reaction itself. The resolution is that of the preexisting paving, and does not require the intervention of any deposition method or of any localized molecular displacement. This is why it allows undifferentiated bulk dipping of the surface to be treated, whereas most of the known methods which pursue the same objective proceed by prior, geographically selective physical displacement of molecules, or physicochemical activation which is intrinsically localized but independent of the resolution of the paving, before applying thereto a grafting which—in itself—is not regioselective. This distinction, which is important in terms of the functioning but also the resolution capacities of the process, leads us to describe the present invention as that of a "one-step" localized grafting.

Next, the grafting takes place in bulk only above a threshold electrical potential, relative to a reference electrode. Thus, it will take place over the entire conductive or semiconductive area brought to this potential, irrespective of the method via which this potential is obtained. On a surface composed of paving with a repeating pattern, in which it is desired to graft only onto a subportion of the pattern but over the entire extent of the paving, the grafting may be achieved in a single step on all these subportions at the same time, provided that they are at the desired potential (which is the case, for example, if they are all simply connected together). This case arises, for example, when microelectronic devices etched on a single large silicon wafer are produced.

Finally, when it is desired to graft onto all the conductive areas of a semiconductive surface, it may be unnecessary to connect the conductive areas together: placing the semiconductive surface that serves as support under a suitable potential may suffice to achieve the grafting onto all the conductive areas, and only thereon.

The present invention may find an advantageous use for the selective functionalization of surfaces such as those of microelectronic circuits (irrespective of their application: biochips, microsensors, "lab-on-chips", memories, etc.), microfluidics devices, micromechanical components or fine jewelry components, and more generally all materials having composite surfaces of which at least some portions are made of conductive and/or semiconductive material.

The grafted organic coating may first of all be used for itself, for example for the functions of: localized insulation, localized conduction, localized biocompatibilization, localized bonding, precise leveling on remote areas of paving, etc.

It may also be used as a primer for attaching other organic substances: it is, for example, an ideal candidate for producing base supports for highly localized organic terminals, such as those used in the manufacture of DNA chips or biochips, protein chips, sensors, self-cleaning microstructured biological surface mimics, etc.

In this, the localized grafting of molecules, polymers or copolymers that are intrinsically insulating is in fact that of localized generic "molecular velcros": it opens the way to a localized grafting of any type of polymerizable or nonpolymerizable organic molecule, especially by subsequent functionalization (for example by chemical or electrochemical functionalization) of the grafted organic film. This aspect constitutes an important feature of the present patent application.

The invention described herein thus relates especially:

To a one-step process for the localized functionalization of chosen conductive or semiconductive portions of composite surfaces consisting, for example, of a paving of patterns, with organic coatings. This process is especially characterized in that a portion is declared chosen when it is at an electrical potential higher than a threshold potential relative to a reference electrode: the functionalization on this portion then takes place without it having been necessary to physically limit the supply of molecules serving for the functionalization only at the surface of this portion. In other words, the functionalization takes place only on the chosen portion(s), although the composite surface is entirely immersed in the medium containing the functionalization precursors.

To the use of the electropolymerization grafting of vinyl monomers or of monomers with a strained ring to achieve the localized grafting as described above.

To the use of the grafting of electrocleavable molecules to produce the localized grafting as described above.

To the molecular structure of the monomers that may be used to achieve a localized grafting by electropolymerization, it being pointed out especially that the term "electropolymerization" covers both polymerizations (pure monomer) and copolymerizations (mixtures of monomers) that are electrochemically initiated.

To the molecular structure of the electrocleavable molecules that may be used to achieve localized grafting via electrografting by cleavage.

To the possibility of using these grafted organic coatings for the functions of: localized electrical and/or thermal conduction, localized insulation, localized biocompatibilization, localized bonding, precise leveling on remote areas of paving, etc.

To the possibility of using these grafted organic coatings as primers for attaching any type of organic molecule, by chemical or electrochemical functionalization of the grafted coating, appropriately chosen as a function of the molecule to be attached thereto.

To the possibility of using the localized grafting as a localized molecular mask, which may be subsequently degrafted, so as to be able to achieve the grafting of other organic compounds onto other areas, and especially areas on which electropolymerization grafting cannot be performed (for example insulating areas).

To application examples demonstrating the selective grafting onto gold or onto Au/Si and Au/SiO$_2$ composite surfaces.

The localized grafting, at the micron or submicron scale, of organic substances onto mineral surfaces is of interest in various fields. Mention may be made, for example, of those connected to microelectronics, its techniques and its applications (new generations of inkjet printing heads, electronic sensors that may be used in vivo—in surgery or as implants, biochips, microfluidics, lab-on-chips, etc.), those linked to the production of surfaces combining micro- or nano-structuring and chemical nature of the deposits (self-cleaning, demisting surfaces, etc.).

In these fields, the challenge is to be able to functionalize a quite specific area of a surface with quite specific organic functional groups, so as to give this portion of the surface entirely specific properties. The advantage is then to be able to juxtapose such functionalized areas having different properties—and thus different functional groups—so as to be able to create a chemical function (sensing, transduction, biocompatibilization, bonding, etc.) or a physical function (electrical, etc.) on the surface or on a portion of the surface.

The invention relates especially to a selective functionalization of conductive or semiconductive pavings on the surface, which have been able to be obtained by other means not of concern in the invention. In the field of microelectronics, for example, they may be gold terminals or tracks on a silicon wafer, obtained, for example, by the traditional techniques of photolithography or electrolithography. The overall resolution of the localized organic functionalization, as performed in the present invention, thus relates to the manner in which the resolution of the initial conductive or semiconductive paving is preserved or degraded by the localized grafting presented herein. In other words, the efficacy of the localization of the grafting of the present invention is evaluated less on the limiting size of each paving than on the way in which the frontiers that it delimits before intervention are preserved by the present functionalization process.

The advantage of performing a localized organic functionalization on certain areas of a surface paving relates to the fact that a certain number of properties, intrinsic to the organic coating deposited, may be given locally to the surface. In particular, an area of the paving may be given specific chemical reactivity which will make it possible to localize subsequent chemical reactions (for example for a second functionalization) using traditional organic synthetic pathways.

This aspect shows its full benefit when the initial paving, before intervention by the present process, consists of mineral compounds, and in particular of different conductors. Specifically, organic compounds are materials with localized surface states: in chemical terms, it is said that they contain functional groups. In this sense, it is "easy" to perform chemistry on an organic surface, since it is a matter of reacting some functional groups with others, and thus of exploiting the experience acquired over the past 100 years in organic chemistry. The situation is quite different for conductive surfaces. The surface of metals is made of delocalized electronic states (apart from the surface defects): in chemical terms, the very notion of a functional group disappears, and the surface chemistry of metals or semiconductors can no longer be treated in the light of the experience acquired in organic chemistry.

The present process makes it possible, in particular, to solve the mineral/organic interfacing problem locally, by precoating chosen areas of the paving with a thin organic coating, which can then serve as a "molecular velcro". For this reason, this functionalization will be referred to hereinbelow as the "primary functionalization".

As will be seen hereinbelow, the process described in the present invention is advantageous since it makes it possible, inter alia:
(i) to ensure a metal/organic interface of unparalleled strength (the organic/metal bonds obtained by electrografting have—to date—never been able to be broken);
(ii) to offer the capacity of "tailor-made" functionalization of the grafted organic film (multipurpose "molecular velcro"), which opens the way to a broad improvization toward "intelligent surfaces".

In other words, according to the invention, in particular, the functionalization is obtained by the electrografting of polymerizable or nonpolymerizable organic molecules, but whose electroreaction product is not electrically active, or at the very least not in the potential area allowing the production of the graft. It may, for example, involve monomers that deliver intrinsically insulating polymers (vinyl monomers, strained-ring monomers, etc.), or electrocleavable molecules. This involves molecules whose grafting takes place, under electrochemical conditions, only above a certain potential threshold, to which the conductive or semiconductive area of the paving is subjected, relative to a reference electrode.

In this:
A paving area is declared a chosen area when it is brought, relative to a reference electrode, to the potential that allows grafting: this potential may be provided by electrical connection and multiplexing, as is described in patent application EP-A1-0 774 662 (1996), to the description of which reference may be made, but also by other methods, as illustrated in the implementation examples.

The localization is due only to that of the paving: neither the triggering nor the supplying of precursors of the localized functionalization are themselves localized processes. They are therefore also less expensive than the existing processes, in terms of implementation.

The resolution of the method, in the challenge of obtaining organic terminals on a surface, consists of the resolution of the method for producing the paving, possibly degraded by the tendency of the present method to "run" at the frontiers of the chosen paving areas. As will be seen, this tendency is negligible compared with the current resolutions in microelectronics.

BRIEF DESCRIPTION OF THE DRAWINGS

The invention will now be described in detail in the description that follows, which is given by way of nonlimiting illustration, with reference to the attached drawings, in which:

In FIG. 11B, the y-axis is given in nm and the x-axis is given in µm;

DETAILED DESCRIPTION OF PREFERRED EMBODIMENTS

Figure 1A:
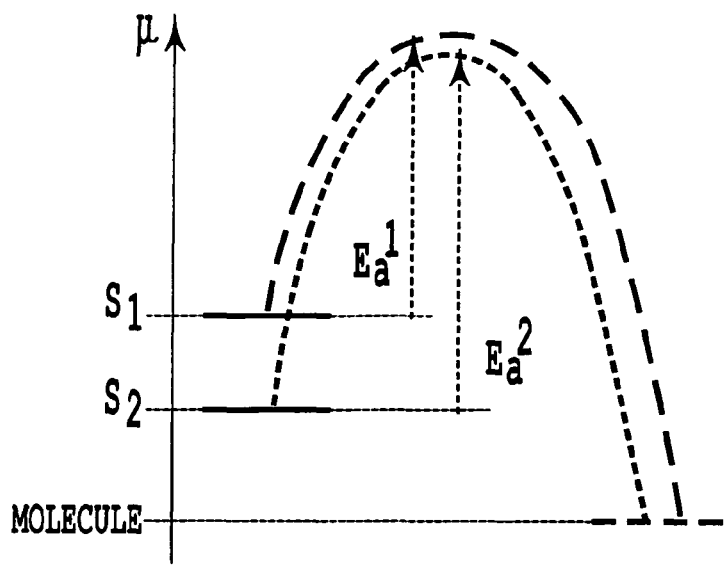
FIGS. 1A and 1B are graphs representing the energy diagram of the levels available to the electrons when two electrically connected surfaces $S_1$ and $S_2$ are dipped in a solution containing a molecule toward which they can transfer electrons. The chemical potential $\mu$ is given on the vertical axis.

In the present invention, the spatial discrimination is performed only on the grafting of the organic compound, and not on its material addressing; all of the composite surface is immersed in the solution containing the molecule to be grafted, and only the area to be grafted is electrically polarized. Grafting thus takes place only on the electrically addressed area, and nowhere else. Once the grafting has been performed, the surface is removed from the solution. After rinsing, the whole surface may again be dipped in another solution (containing another molecule) in which another area may then be addressed for grafting.

The grafting is performed by organic electrochemistry, above an electrode potential set relative to a reference electrode. The candidate reactions are, for example, electropolymerization of monomers capable of undergoing. anionic or cationic polymerization (vinyls or strained rings, as described, for example, in FR-A-2 480 314), or electrocleavage reactions (as described, for example, in WO-A-98/44172 for diazonium salts, or alternatively in WO-A-98/40450 for carboxylic acid salts). The common factor in these reactions is that they deliver, via electrochemistry, a reaction product that is chemically grafted onto the surface.

As outlined hereinbelow, this process, which has never before been considered for the localized grafting of organic materials, is the only process that allows localization of the coating with a resolution that is dictated by all or some of the paving pattern, while all of the surface is in contact with the solution.

This fundamentally novel and inventive aspect of the process of the invention has its origin in the elucidation of the mechanisms of the grafting reactions, which are recalled briefly hereinbelow. Our attention will be drawn to electropolymerization reactions, but the principle is the same for electrocleavage reactions. The account of the mechanism of functioning of this localized grafting will be given on the example of composite surfaces of electronic microsystem type (gold etchings onto silicon or silica).

However, there is no reason to limit the application of the process according to the invention to materials of this type or to surfaces of this type, since this process covers all composite surfaces comprising insulators, semiconductors and/or conductors. This emerges clearly when the mechanism that we propose for localized grafting is examined. It is for this reason that we are describing this mechanism herein in some detail: the objective is not to present a rigorous theoretical formalization, but to show how the content of the invention may be extended to materials or to applications not explicitly cited herein, but for which a person skilled in the art will logically know how to draw the consequences allowing a technical improvement.

The chemical mechanism of the electropolymerization grafting of vinyl monomers is thus described hereinbelow.

a. Mechanism

The electropolymerization of a vinyl monomer on a surface is performed by subjecting the surface to an electrical polarization—relative to a reference electrode—while it is dipped into a solution containing it. This may be a negative (or cathodic) polarization or a positive (or anodic) polarization, depending on the nature of the monomer to be polymerized.

The synthesis is performed in anhydrous organic solvent (acetonitrile, DMF, etc.), in the presence of a support electrolyte generally consisting of an organic salt (for example tetraethylammonium perchlorate, or TEAP). The synthetic procedures have been described in the literature[6]. As has been specified in the literature[7, 8], the electropolymerization of vinyl monomers gives two reaction products, which are structurally identical but readily separable:

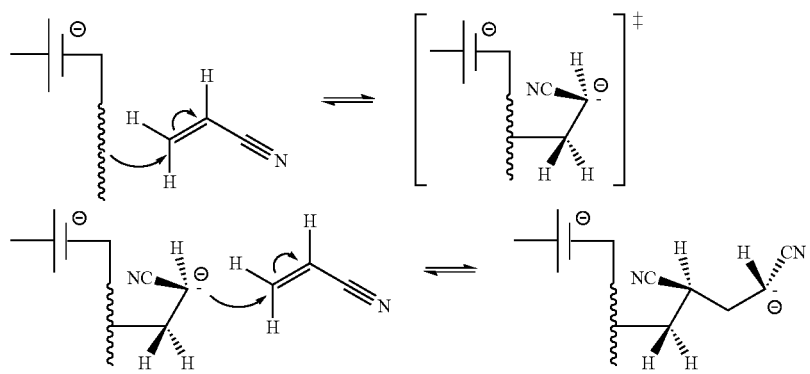

1.1. Surface Chemical Reaction Grafting

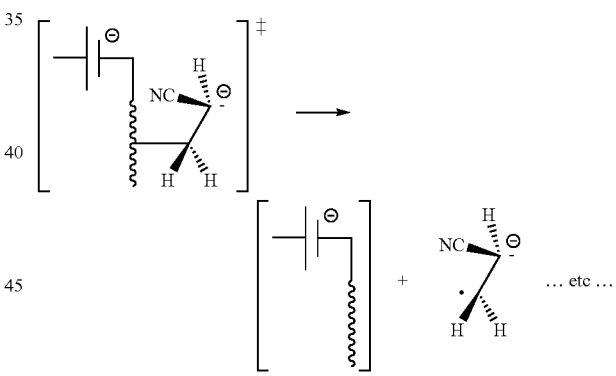

1.2. Desorption, Polymerization in Solution

Schemes 1.1. and 1.2. above describe the reaction mechanism taking into account: (1.1.) the grafting of the polymer; (1.2.) the formation of the anion radical in solution, giving rise to the formation of the polymer in solution (see scheme 2). The schemes relate to the example of acrylonitrile.

A polymer chemically grafted onto the surface, the thickness of which may be up to about one hundred nanometers. The interface chemical bonding was demonstrated by X-ray photoelectron spectroscopy (XPS) on thin films[9], and also by various other methods[10]. This film is resistant to rinsing, even in a good solvent for the polymer, even under ultrasound. In contrast with what has been observed for conductive polymers, this grafted polymer is present even when the surface is subjected to large convection movements (for instance when the surface is in rapid rotation, at the turbulence limits, at more than 10 000 rpm)[11]. These data led to the proposal of a grafting mechanism based on an initiation of polymerization starting from the surface (scheme 1): the metal/molecule electron transfer takes place on the surface of the electrode. In the case of a cathodic polarization, for example, it results in the formation of an adsorbed anion radical, the finite lifetime of which conditions the coupled chemistry. If this lifetime is relatively long, this adsorbed anion radical can add to a monomer molecule and form a dimer, which is more stable since the source of instability (the negative charge) has been distanced from the negative surface: the formation of the grafted polymer has taken place (scheme 1-1);

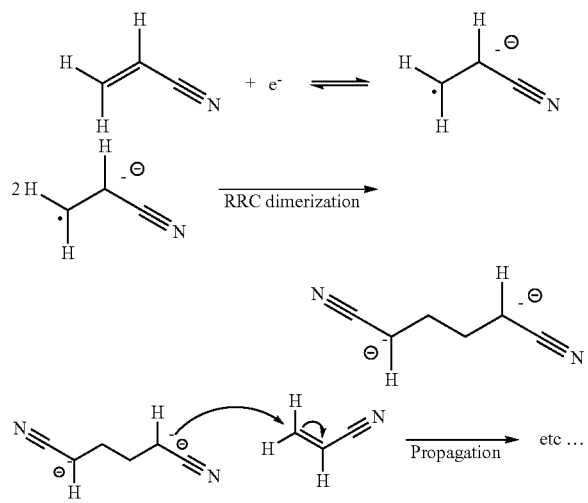

2. Formation of Polymer in Solution

Scheme 2 above describes the reaction mechanism which is the basis of the formation of the polymer in solution, following desorption of the anion radical (scheme 1-2), during the electropolymerization reactions.

An ungrafted polymer, also known as a "polymer in solution", of the same structure as the grafted polymer, but readily removed by rinsing with a good solvent for the polymer. It has been proposed that this polymer results from desorption of the anion radical constituting the reaction intermediate, as a result of a lack of availability of fresh monomer during the lifetime of the anion radical on the surface (scheme 1-2). The resulting polymerization takes place entirely in solution, since the polymer gains in mass on the surface (scheme 2).

b. Nature of the Metal/Molecule Electron Transfer

It is obviously—in this case—the grafted polymer that is of major interest for the proposed invention. In order to understand how the grafting may be localized on a composite surface, it is essential to describe in detail the way in which the electron transfer takes place.

It has been demonstrated that the description of the metal/molecule electron transfer may be performed very advantageously in the context of a Lewis acid/base model[7, 12]. In this model, each antagonist (the polarized metal surface and the monomer molecule facing it) has an overall chemical potential, μ: this chemical potential may be defined very rigorously in mathematical terms, but is also measurable[7, 8]. For a metal surface, the chemical potential is, for example, equal to the opposite of the work function of the metal (and is generally expressed in electron-volts). It is also demonstrated that the chemical potential is equal, generally speaking, to the opposite of the electronegativity, which is a more intuitive notion—but is strictly synonymous, give or take the sign—for describing the electron transfers.

The capacity for electron exchange between the two systems is simply linked to these chemical potentials. It may be evaluated semi-quantitatively by means of the number of electrons ΔN exchanged due to this chemical potential difference:

$$\Delta N = K_{AB}(\mu_B - \mu_A) \quad (E1)$$

in which A and B are, respectively, the Lewis acid and the Lewis base in the interaction, i.e. the electron acceptor and the electron donor, and $K_{AB}$ is a positive constant. In the equation (E1), it is thus stated that the electron transfer takes place from the highest chemical potential toward the lowest chemical potential (or alternatively: from the lowest electronegativity toward the highest electronegativity).

It has furthermore been demonstrated that when a metal is linked to an external potential (for example a battery), then the chemical potential of the metal is linearly linked to the experimentally imposed electrode potential, $\Delta E$[7, 12]:

$$\mu_{metal} = -\Delta E + \text{const}(\text{Ref}, \text{solvent}) \quad (E2)$$

in which the constant depends only on the solvent used and the nature of the reference electrode. By simple reasoning, it can be demonstrated that this constant is measurable, and equal to: const=$\Delta E_{PZC}-\Phi$, in which $\Delta E_{PZC}$ is the zero charge potential of the metal in the solution (measurable) and $\Phi$ is its work function under vacuum (also measurable)[7, 12].

By bringing together the content of equations (E1) and (E2), it is concluded that polarization of the metal tends to promote and to exacerbate the differences in chemical potential between the surface and the molecule, and thus to increase the capacity for electron exchange. When negative polarization is performed ($\Delta E<0$), the chemical potential of the surface becomes increasingly high, exceeds that of the molecule and tends to promote a metal ⇒ molecule transfer: it is this that results in the reaction scheme described in scheme 1, which is effectively obtained under cathodic polarization. The speed at which this electron exchange takes place conditions the electrical current that flows in the circuit.

At what speed does this exchange take place (?). The answer comes from Marcus' theory, which indicates that the current i obeys a law of the type (Marcus' theory):

$$i = k_0 e^{\frac{E_a}{kT}} \Gamma \quad (E3)$$

in which $E_a$ is an activation energy, which the system must cross in order for the electron transfer to effectively take place, and $\Gamma$ is a magnitude characteristic of the concentration of the molecular species in the region of the surface.

The electronic mechanism of the localized grafting is now described hereinbelow.

From the three equations (E1)-(E3), the possibility of a localized electron transfer, and thus of localized grafting if this electron transfer is the one which takes place in an electropolymerization reaction, are readily deduced.

Figure 1B:
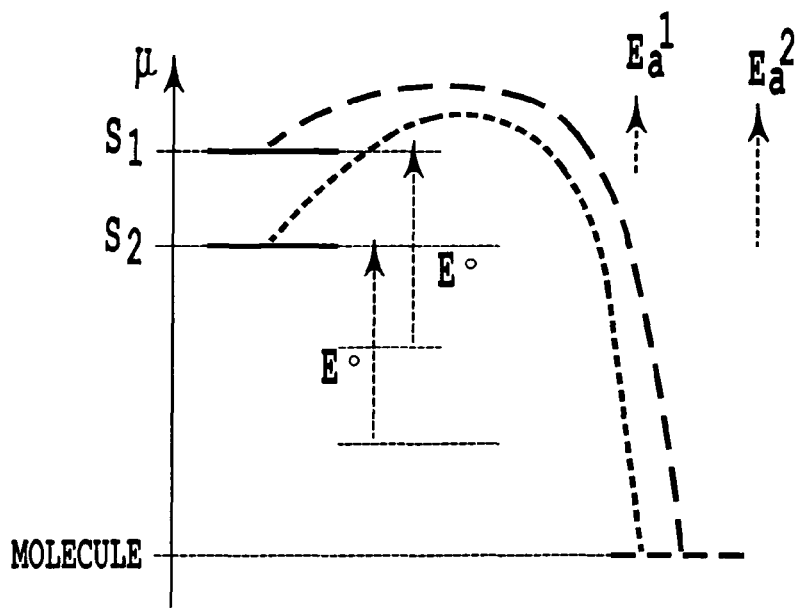

Specifically, let us consider two surfaces of different nature, for instance a gold surface $S_1$ and a silicon surface $S_2$, each having their respective work function, $\Phi_1$ and $\Phi_2$, and their respective zero charge potential, $\Delta E_{PZC}^1$ and $\Delta E_{PZC}^2$ (FIGS. 1A and 1B). FIG. 1A shows the position of the chemical potentials when the two surfaces are at their zero charge potential. (N. B.: it has been estimated that the zero charge potentials were similar, in order to be able to be reached simultaneously, when the two surfaces are in electrical contact): gold, which has a lower work function (in solution) than silicon, is placed above silicon.

Let us take the example of the interaction of these surfaces with acrylonitrile (scheme 1). It is found, quantitatively, that these two levels are above that of acrylonitrile[7]. However, at the PZC, no current flows because the activation barriers (equation (E3)) are too high, both for gold/acrylonitrile transfer (barrier $E_a^1$) and for silicon/acrylonitrile transfer (barrier $E_a^2$) (FIG. 1A).

If the gold/silicon composite surface is now negatively polarized, it is known (equation (E2)) that this causes the chemical potentials of the two surfaces (which are still in electrical contact) to rise. With the chemical potential of the molecule remaining—to a first approximation—unchanged, Marcus' theory indicates that it is then the activation energies that decrease when polarization is performed (FIG. 1B): since gold is above silicon, its activation barrier will be lowered first, and it will be possible to promote the gold/acrylonitrile transfer whereas the silicon/-acrylonitrile transfer will still be inoperative. Putting it plainly, the first current that will be measured will flow almost exclusively through the gold, which amounts to stating (scheme 1) that the grafting of polyacrylonitrile will take place almost exclusively on the gold and not on the silicon.

It is therefore quite important to state that the localized grafting using the electropolymerization reactions proceeds from a kinetic selectivity: there is polymer grafted onto $S_1$ and not onto $S_2$ because the electron transfer and thus the growth of the grafted film are faster on $S_1$ than on $S_2$, and not because they are impossible on $S_2$.

In other words, FIGS. 1A and 1B represent the energy diagram of the levels available to the electrons when two surfaces $S_1$ and $S_2$, which are electrically connected, are dipped in a solution containing a molecule toward which they can transfer electrons. In (a), (on FIG. 1A), a potential $\Delta E$ is imposed on the two surfaces that is equal to their PZC [(a) $\Delta E = \Delta E_{PZC}$]. It is noted that the activation barrier is higher for an electron transfer from $S_2$ than from $S_1$. In (b), (on FIG. 1B), an electrode potential equal to $E°$ has been applied, relative to the PZC [(b) $\Delta E = E° + \Delta E_{PZC}$], and the levels of $S_1$ and $S_2$ have been correlatively displaced ($E°<0$). It is seen that the activation barrier of $S_1$ ($E_a^1$) disappears before that of $S_2$: there is therefore an intermediate situation in which the passage of electrons may be allowed by the surface $S_1$ and not yet by $S_2$.

An important consequence of this scheme of FIGS. 1A and 1B is that the localized grafting process by electropolymerization takes place irrespective of the position at which the potential is applied, provided that the various areas of the paving of the composite surface are brought to the desired potential, allowing grafting (it may be noted that there may be a drop in resistance between the different pavings. This is the case, for example, between a gold track and the underlying silicon or silica, in a chip, given that it has generally been necessary to produce an undercoat under the gold in order to improve its adhesion): as will be seen in the application examples, the result is identical (i.e. the grafting takes place only on the gold) whether the electrical contact is placed on the gold or on the silicon.

The reasoning applied herein to gold and to silicon remains valid for any two surfaces that are electrically connected, and whose work functions are sufficiently different for the discrimination to take place in terms of activation barriers. It may be envisioned, for example, on the principle, to produce selective grafting on certain faces of a polycrystal consisting of a paving of monocrystals, since it is known that the work function of a monocrystalline surface depends on the crystallographic orientation (Marcus' theory).

By virtue of this mechanism, it is also appreciated why it is paramount for the polymer (and more generally the grafted organic coating) resulting from the electrografting reaction to be an insulator, and why it is not possible to produce localized grafting using monomers that give conductive polymers, for instance thiophene or pyrrole. Specifically:

The mechanism of scheme 1 is not valid for conductive monomers: there is no grafting reaction, and the essence of the chemistry coupled to the transfer takes place in solution. The chemical plot of the geographical area in which the electron transfer has taken place therefore cannot be detected.

When conductive polymer forms on the surface at one place, it is itself capable of permitting the flow of current, with an activation barrier which will remain less than that of silicon: the polymer formed constitutes a third conductive surface, which will thus grow on itself and spread, and soon cover the entire surface. If the transfer has indeed been initialized locally, the chemistry resulting therefrom erases the memory of this localization.

The experimental characteristics generally defining the process according to the invention will now be described.

Reagents that May be Used and Synthetic Medium

The details outlined hereinabove show that the reagents that may be used are firstly monomers that may undergo ionic polymerization, leading to an insulating polymer.

They may be, for example:

vinyl-based monomers, for example, which may undergo ionic polymerization or may be initiated ionically. These monomers are, for example, of general formula B—R-A, in which R is a group bearing a vinyl double bond, B is an electron-withdrawing or electrondonating functional group (polymerization motor), and b is any functional group bearing a function that it is desired to give to the final polymer. The following, for example, may be initiated by cathodic polarization: acrylonitrile[6, a], methacrylonitrile[6, a], para-chlorostyrene[16], 4-vinylpyridine[17], alkyl methacrylates (methyl methacrylate, ethyl methacrylate, butyl methacrylate, etc.), cyano acrylates, etc. 4-vinylpyridine[17], N-vinyl pyrrolidone[6, b], etc. may, for example, be initiated by anodic polarization;

any molecule comprising at least one strainded ring or based on strained rings that may be opened by nucleophilic or electrophilic attack, for instance molecules containing an epoxy group and more generally oxiranes.

All these monomers, functionalized monomers derived from these base monomers, and also any mixture of these monomers may be considered as being usable, provided that they satisfy the constraints of electrochemical synthesis leading to grafting onto the polarized surface.

In the cathodic electropolymerization reactions, for example, the polymerization coupled to the charge transfer is an anionic polymerization[18].

Molecules bearing electrocleavable functional groups, giving radicals that may be chemically grafted onto the surface, may also be candidates. Mention may be made, for example, of diazonium salts—as described in patent applications WO-A-98/44172, to the description of which reference may be made—or alternatively carboxylic acid salts—as described in WO-A-98/40450, to the description of which reference may be made.

Irrespective of the type of molecule chosen to perform the electrografting, a support electrolyte may be added to the reaction medium to facilitate the flow of the electrical current in the solution.

Protocol for Placing under Potential

The potential to which the working electrode is subjected, relative to the reference electrode, is an entirely decisive factor as regards obtaining an electrografting reaction.

The voltammograms measured for vinyl monomers in organic solvent, for example, generally show a peak, which is linked to the redox potential of the monomer under consideration. For most of the vinyl monomers examined to date, there is a quite specific concentration regime in which the voltammograms comprise two peaks, whereas there is only one type of charge transfer reaction. It has been demonstrated that the first peak is due to the massive consumption of the monomer in the region of the electrode due to the polymerization in solution, whereas the second peak corresponds to the reaction at the electrode of the monomer that has not been consumed by the polymerization[19].

This result provides valuable information, irrespective of the monomer concentration range: above the peak potential, polymer in solution is essentially manufactured. The potential protocol may thus be adapted as a function of this information so as to increase the yield of the grafted polymer:

If the process is performed with a solution without crosslinking agent, everything that is formed in solution is "lost" on rinsing: irrespective of the potential protocol (voltametric conditions, multiple slots, etc.), it is preferable to choose a cutoff potential (or inversion potential) that is lower than the peak potential.

If the process is performed with additives which make it possible to securely attach the grafted polymer of the ungrafted polymer (crosslinking agents, see next paragraph), it is preferable to choose a cutoff potential that is higher than the peak potential.

Similarly, it has been demonstrated that optimum grafting may be obtained with molecules containing a functional group that is electrocleavable above a certain potential (WO-A-98/44172 and WO-A-98/40450).

The potentialities of the localized grafting are described hereinbelow.

The localized grafting, the principle of which has just been outlined, and which is illustrated in the application examples that follow, may be used in several ways:

A crude organic film may be grafted locally so as, for example, to promote an electrically insulating area, or alternatively the localized deposition of a substance with particular properties (chemical, physical (polarity or the like), optical, magnetic, etc. properties) may be performed. In the latter case, it will then be necessary to prefunctionalize the precursor of the organic film with the appropriate function, before electrografting.

The locally grafted organic film may be subsequently functionalized or modified, to give it properties (chemical, physical, optical, magnetic, etc. properties) that it did not have at the start, and which will in fact themselves also be localized, even if it is performed by overall dipping. It is possible, for example, to subsequently cure the electrografted polyacrylonitrile in order to make it electrically conductive and a good candidate for lubrication. Still, for example, with the aim of making it electrically conductive, the locally grafted polymer may be doped. It is known practice, for example, to "pack" polymers with silver salts, which may then be revealed in situ with a photographic (reductive) developer (hydroquinone, pyrogallol, p-phenylenediamine, p-aminophenol, etc.), making the polymer conductive[21]. Flexible conductive areas may thus be produced, for example, by this process.

The organic film may be functionalized a priori, specifically, so as to make a "molecular velcro", on which any subsequent functionalization will remain localized, even it is performed by overall dipping. It may be envisioned, for example, to produce localized bonding by introducing a vinyl monomer functionalized with amine functions (protected, where appropriate) into the formulation: once deprotected, the amine functions can then react selectively with an epoxy adhesive. Adhesive bonding is, obviously, only one example, and any type of functionality may be added locally (lubrication, optical, chemical, physical, magnetic, etc. properties), since the problem has been shifted: since the localization was obtained by means of polymer grafting, the problem amounts to that of chemistry on a polymer, irrespective of the localization, this localization then being implicit.

The grafted organic film may also serve as a mask: let us suppose that it is desired to graft—in the example of a gold-covered silicon wafer—on the silicon rather than on the gold. According to FIG. 1, this is impossible to achieve directly. However, the process may be performed in several steps: (i) grafting any organic film onto the gold; (ii) grafting the desired organic film onto the silicon (since the gold tracks are protected (and in particular insulating) once covered with a polymer film, for example; (iii) degrafting the polymer deposited on the gold. Taking into account what has been outlined above, the first two steps may optionally be combined into a single step by pushing the cutoff potential of the experimental protocol above the peak potential.

The natural tendencies may also be inverted (FIGS. 1A and 1B) by premasking the surface that it is desired to preserve with any substance that will be specifically adsorbed thereon, even on a monolayer: with reference again to FIGS. 1A and 1B, it is seen that the underlying idea consists in increasing the work function of the surface $S_1$ relative to $S_2$, and in making it "pass below" by means of a pretreatment. Thiols are thus suitable candidates for masking gold, and silanols (for instance γ-APS) for $SiO_2$, etc.

The invention will now be described with reference to the examples that follow, which are given as nonlimiting illustrations.

EXAMPLES

1. Regioselectivity of the Grafting: Nature of the Samples

Figure 2A:
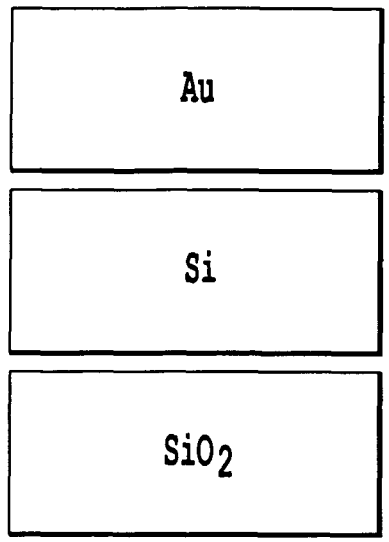
FIGS. 2A and 2B are diagrammatic top views of the samples used in the application examples.
Figure 2B:
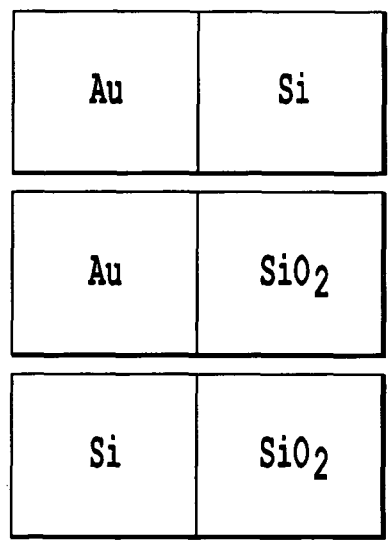

Two series of samples were considered. Firstly, the composite surface samples examined are of rectangular geometry, 10×50 mm in size (FIGS. 2A and 2B). FIGS. 2A and 2B are top views of the samples used in the application examples. The silicon is obtained by epitaxy of p- or n-doped silicon on SOI substrate ($SiO_2$). The gold is obtained by vacuum deposition onto a titanium/nickel undercoat, onto SOI substrate or onto silicon, depending on the sample.

The layer of Si epitaxy-deposited onto $SiO_2$ is 480 nm. The Ti—Ni undercoat is composed of 250 nm of Ti and 450 nm of Ni. The gold layer has a thickness of 200 nm.

XPS analyses on virgin $Au/SiO_2$ and Au/Si samples:
Au side: 55.9% Au, 31.6% C, 12.0% O, 0.5% Ni;
$SiO_2$ side: 44.9% Si, 3.8% C, 50.5% O, 0.3% Au, 0.3% N, 0.2% Ti, trace Ni;
Si side: 32.8% Si, 14.4% C, 51.6% O, 0.3% Au, 0.3% N, 0.8% Ti, trace Ni.

Profilometric analysis of the step edge of the $Au/SiO_2$ and Au/Si mixed samples before organic deposition: step height=760±10 nm.

Figure 3A:
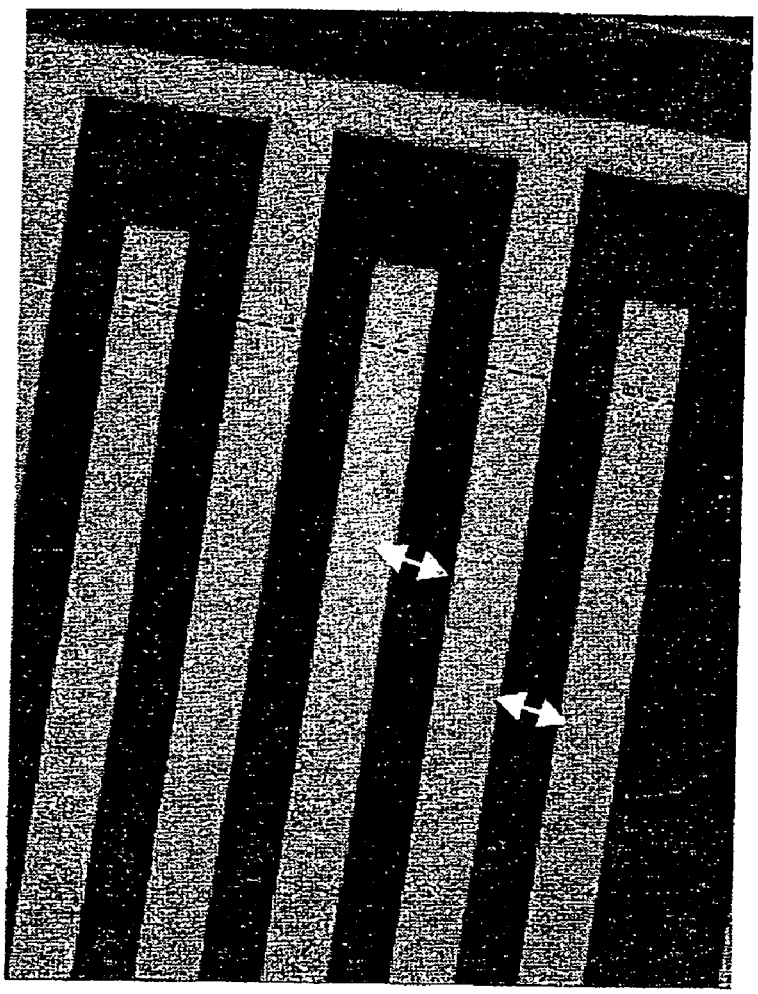
FIG. 3A is an optical microscope image of two photolithographic interdigitated gold combs on a thick silica surface.
Figure 3B:
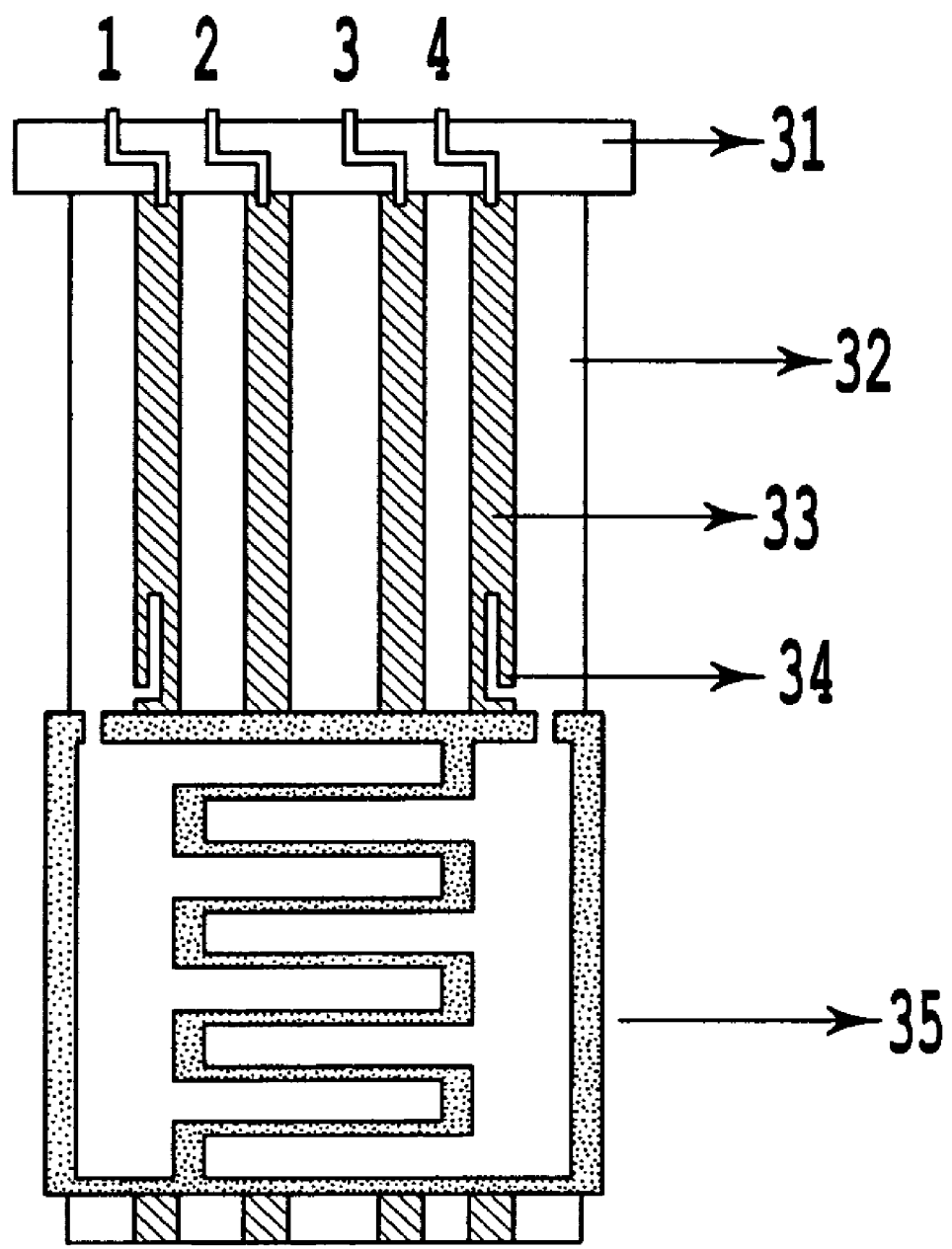
FIG. 3B is a scheme of the assembly produced to contact the double comb, for example that of FIG. 3A, onto an epoxy substrate with copper tracks, for connection to the switchbox and to the potentiostat.

Next, we also considered interdigitated combs of gold on thick silica, obtained by photolithography (FIGS. 3A and 3B). Three types of comb were produced, for which the distances between two interdigitated teeth are, respectively, 128, 32 and 8 μm.

Figure 4A:
FIGS. 4A, 4B and 4C are graphs showing the thickness profile of three types of photolithographic interdigitated combs, for example those of FIG. 3A (with, respectively, distances between the interdigitated teeth of 8, 32 and 128 µm). The y-axis is given in nm and the x-axis is given in µm.
Figure 4B:
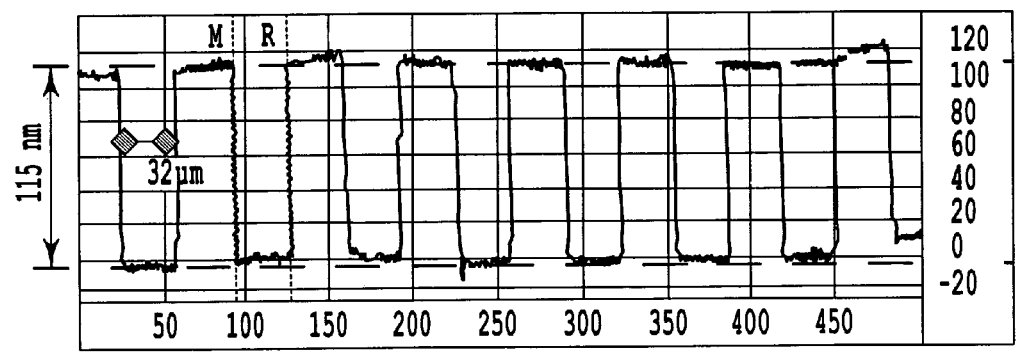
Figure 4C:
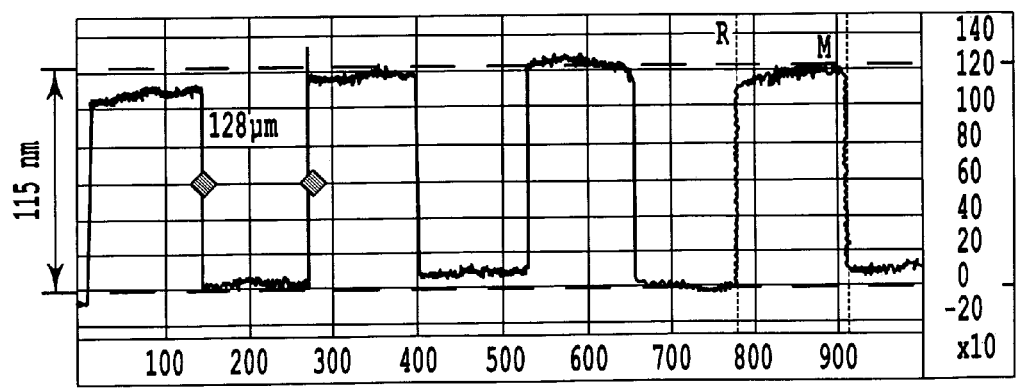

More specifically, FIG. 3A is an optical microscope photograph of two interdigitated gold combs photo-lithographed onto a thick silica surface. Three samples were made, the distances between the interdigitated teeth of which (white arrows) are, respectively, 128 μm, 32 μm and 8 μm. The dotted line in FIG. 3A indicates the path of the profilometric measuring tip, the results of which are given in FIGS. 4A, 4B and 4C. FIG. 3B is the assembly scheme produced for contacting the double comb on an epoxy substrate with copper tracks, for connection to the switchbox and to the potentiostat. FIG. 3B shows the electrical addressing box (31), the epoxy substrate (32), the Cu tracks (33), the gilded contacts (34) and, finally, the $SiO_2$/Au combs (35). The gold superelevations constituting the teeth of the combs have a height of about 115 nm, as measured by atomic force microscopy (AFM) or by profilometry, as shown in FIGS. 4A, 4B and 4C, respectively. More specifically, these figures show the thickness profiles of the three types of photolithographic interdigitated combs of FIG. 3. The rough areas apparent at the top of each comb tooth are irrelevant, given that the distances between the teeth and the teeth widths are of the same order of magnitude as the lateral precision of the apparatus.

2. Characteristics of the Synthetic Protocol

Solution: methacrylonitrile (40%) in DMF, in the presence of $5 \times 10^{-2}$ M of tetraethylammonium perchlorate (TEAP).
Cell: Teflon®, without separate compartments, volume 13 ml.
Counterelectrode: 10.4 $cm^2$ Pt sheet.
Reference electrode: $Ag/AgClO_4$.
Working surface electrode: 3 $cm^2$ for the rectangular composite samples.
Electrochemistry: N cycles, voltametric conditions: 100 mV/s, with ohmic drop compensation=IR. Potential range: $V_{on}$ to $V_{off}$. The whole prong is dipped in the synthetic medium. The electrical contact (crocodile clip) is made either on the gold or on the other material of the paving.
Rinsing of electrode: 15 minutes under ultrasound in acetone+15 minutes under ultrasound in water.

3. Analysis of the Samples

The various macroscopic samples (composite prongs) are analyzed, on each paving of the surface:
by infrared reflection-absorption spectroscopy (IRRAS). The nitrile band (at about 2 200 $cm^{-1}$) is also used, on the IR spectra obtained, for rapid evaluation of the thicknesses of the films, by means of IRRAS/XPS/ellipsometry nomograms produced on polymethacrylonitrile;
by X-ray photoelectron spectroscopy (XPS). Besides the overall spectrum, an additional acquisition is made on the region of the N1s line of nitrogen (characteristic of polymethacrylonitrile). The ratio S between the N1s intensities on the grafted and ungrafted areas constitutes our measurement of the selectivity of the localized grafting.

The microscope samples (interdigitated combs) are examined by AFM and by profilometry, so as to verify the lateral resolution of the grafting, i.e.:
(i) two teeth 8, 32 or 128 μm apart are not "joined" by the grafted coating;
(ii) if only one of the two combs is polarized at the potential which allows grafting, the other comb facing it being at the reference electrode potential, the grafting will take place only on the polarized comb.

4. Macroscopic Samples (Composite Prongs)

Four series of samples were produced: Si(n) $SiO_2$/Au, Si(p) $SiO_2$/Au, Si(n)/Au and Si(p)/Au. The thicknesses of the deposits obtained on the gilded pavings range from 5 to 120 nm depending on the electrochemical protocols, the quality of the gold surfaces and the nature of the doping of the silicon.

4.1. Infrared Analysis

Figure 5A:
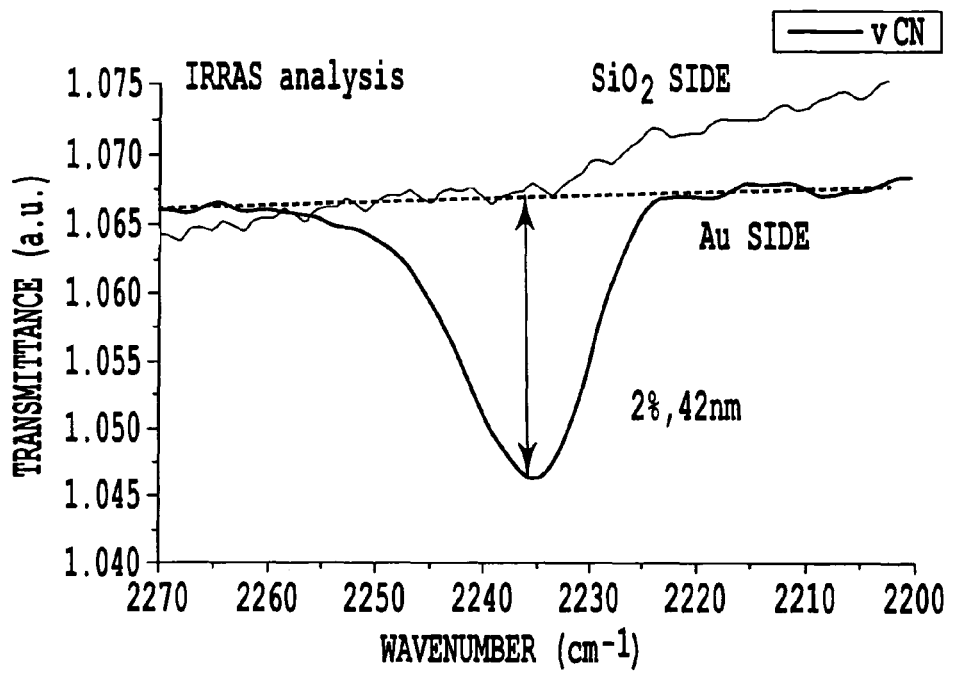
FIGS. 5A and 5B are graphs representing two series of IRRAS spectra, compared on Si(p) $SiO_2$/Au mixed surfaces in the nitrile region. The transmittance (a. u.) is given on the y-axis and the wavenumber ($cm^{-1}$) is given on the x-axis.
Figure 5B:
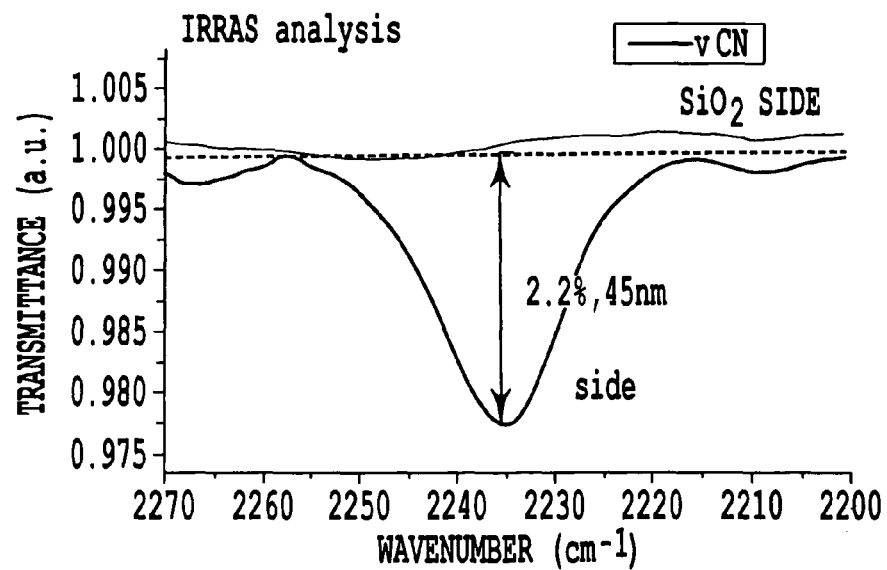

FIGS. 5A and 5B show the compared IRRAS spectra, in the nitrile region, on the gold side and on the $SiO_2$ side for a (p) doped silicon. The thicknesses obtained in the two cases are of the order of 40 nm, but correspond to gold surfaces of different qualities (listed as first and second series of samples), and according to different electrochemical protocols.

More specifically, FIGS. 5A and 5B are the compared IRRAS spectra on Si(p) $SiO_2$/Au mixed surfaces (FIGS. 2A and 2B) in the nitrile region. The spectrum of FIG. 5A was produced under the following conditions: first series: 50 scans, $V_{on}$=−0.641 V/($Ag^+$/Ag), $V_{off}$=−2 400 V/($Ag^+$/Ag), IR=100Ω; and the spectrum of FIG. 5B was produced under the following conditions: second series: 10 scans, $V_{on}$=−0.538 V/($Ag^+$/Ag), $V_{off}$=−2 600 V/($Ag^+$/Ag), IR=100Ω. The surfaces are of different origin in each series.

Figure 6:
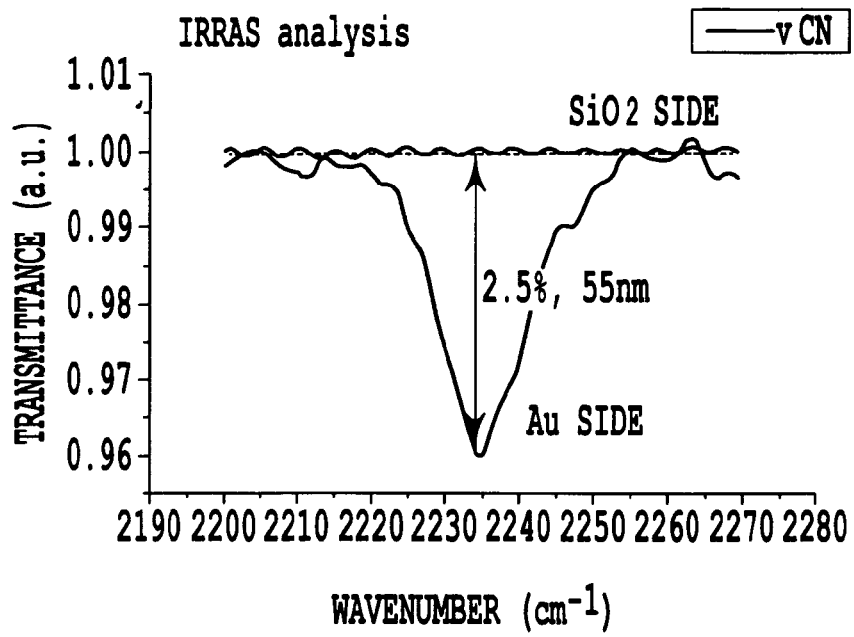
FIG. 6 is a graph representing a series of IRRAS spectra compared on Si(n) $SiO_2$/Au mixed surfaces in the nitrile region.

FIG. 6 shows the same compared IRRAS spectra for an Si(n) $SiO_2$/Au mixed surface of the first series.

More specifically, FIG. 6 shows the compared IRRAS spectra on Si(n) $SiO_2$/Au mixed surfaces (FIGS. 2A and 2B) in the nitrile region. First series: 20 scans, $V_{on}$=−0.723 V/($Ag^+$/Ag), $V_{off}$=−2 400 V/($Ag^+$/Ag), IR=80 Ω.

Figure 7A:
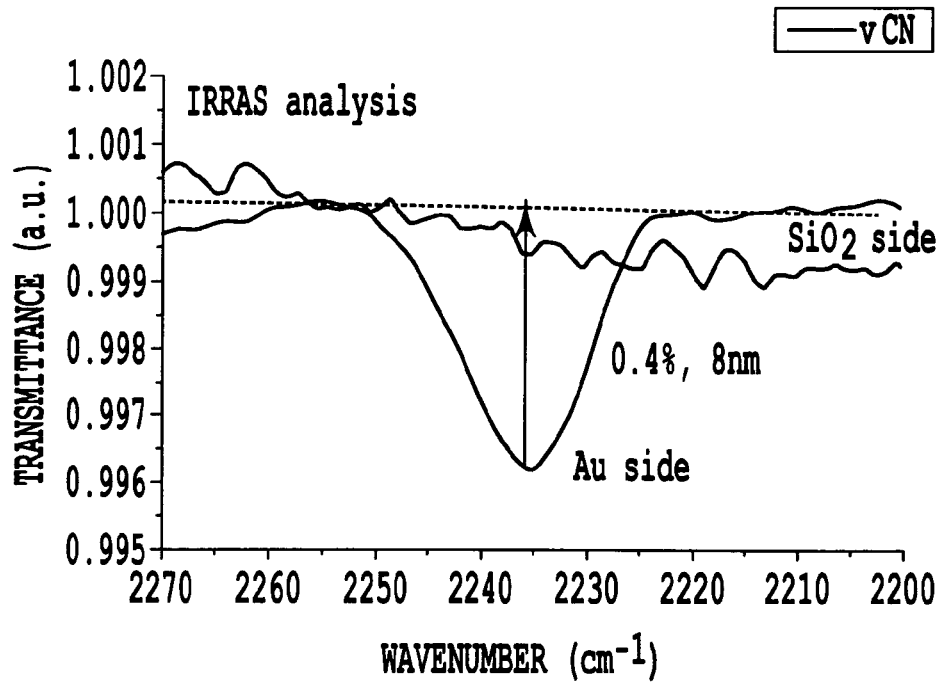
FIGS. 7A and 7B are graphs representing two series of IRRAS spectra compared on Si/Au mixed surfaces in the nitrile region.
Figure 7B:
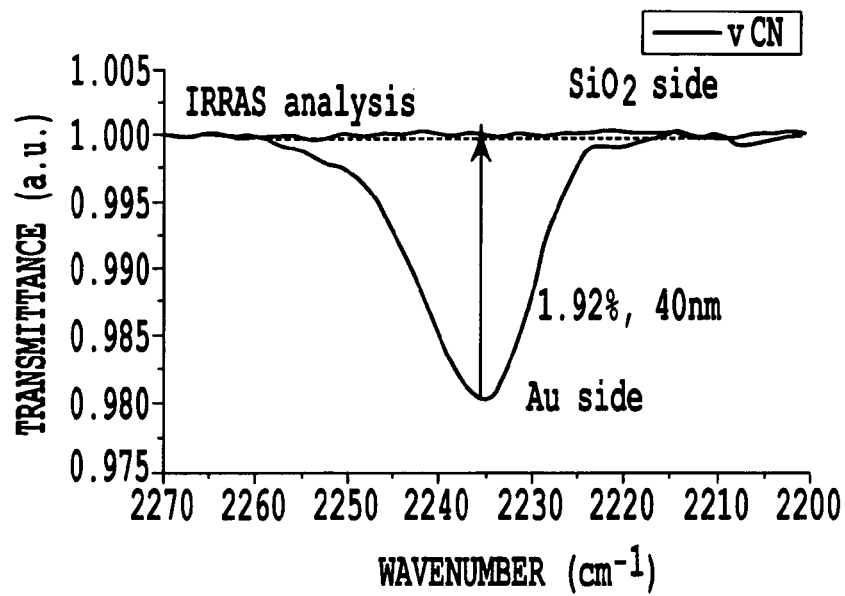

FIGS. 7A and 7B show the compared IRRAS spectra, in the nitrile region, on the gold side and on the Si side for an (n) and (p) doped silicon.

More specifically, FIGS. 7A and 7B show the compared IRRAS spectra on Si/Au mixed surfaces (FIGS. 2A and 2B) in the nitrile region. FIG. 7A: Si(n), 50 scans, $V_{on}$=−0.599 V/($Ag^+$/Ag), $V_{off}$=−2 300 V/($Ag^+$/Ag); FIG. 7B: Si(p), 10 scans, $V_{on}$=−0.747 V/($Ag^+$/Ag), $V_{off}$=−2 400 V/($Ag^+$/Ag), IR=70 Ω.

4.2. XPS Analysis

Figure 9:
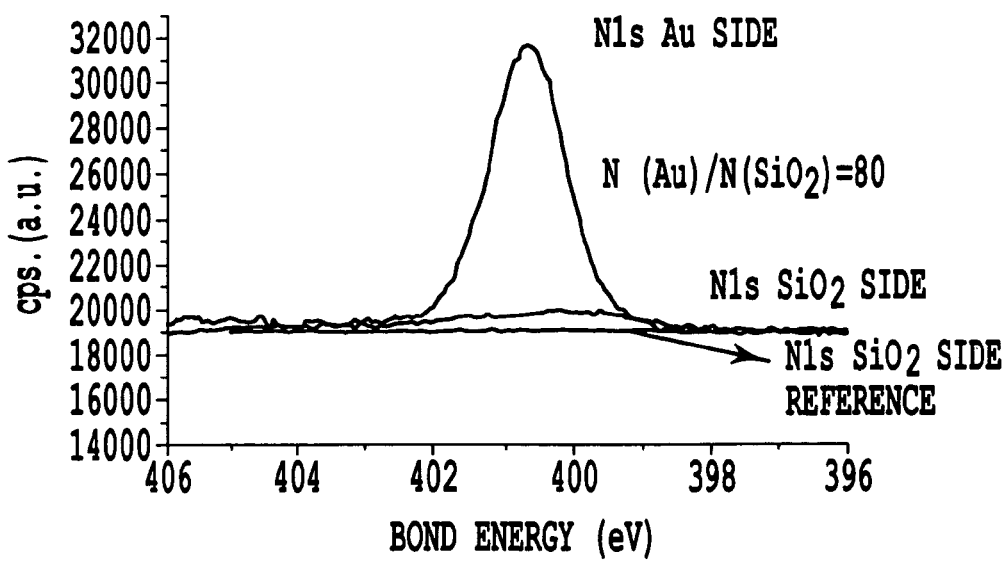
FIG. 9 is a graph representing the XPS spectra compared on Si(n) $SiO_2$/Au mixed surfaces (FIGS. 2A and 2B) in the N1s region of nitrogen.
Figure 8A:
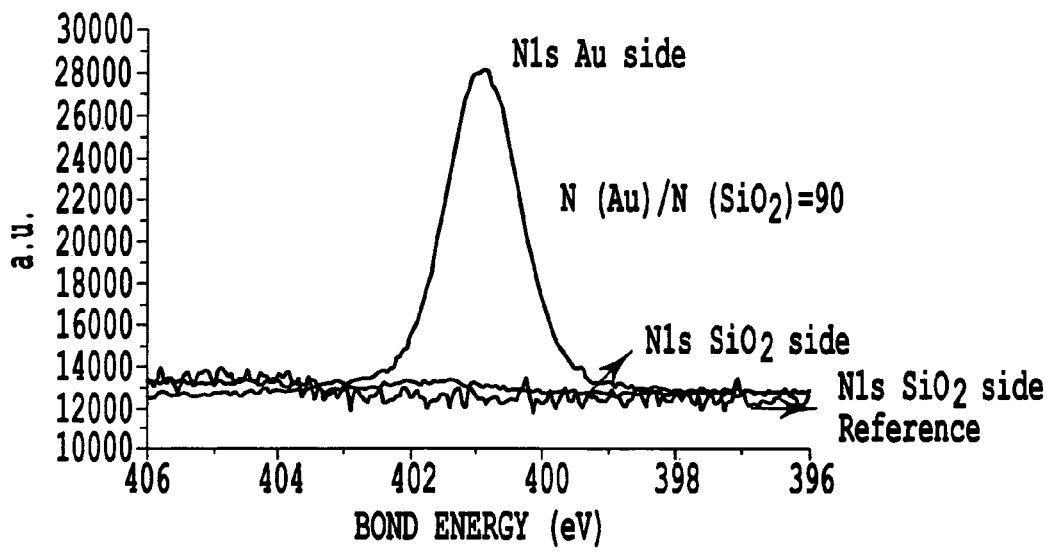
FIGS. 8A and 8B are graphs representing two series of XPS spectra compared on Si(p) $SiO_2$/Au mixed surfaces in the N1s region of nitrogen. The bonding energy (in eV) is given on the x-axis and the cps (in a. u.) is given on the y-axis.
Figure 8B:
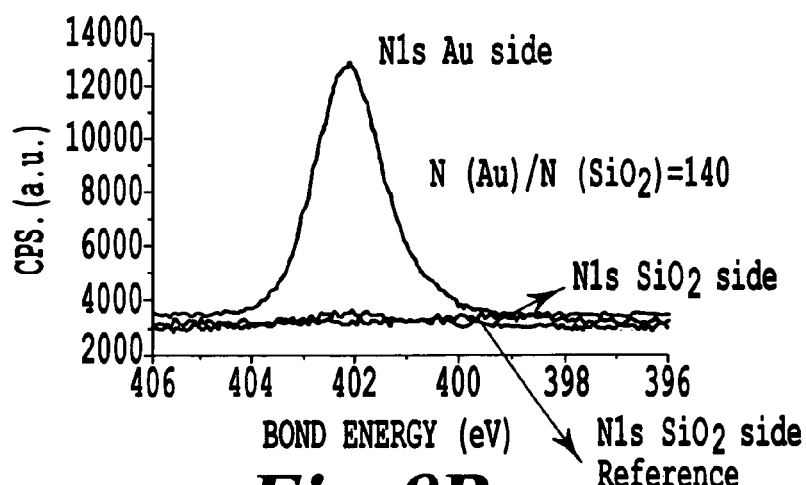

FIGS. 8A and 8B show the compared XPS spectra, in the region of the N1s line of nitrogen, on the gold side and on the $SiO_2$ side for a (p) doped silicon, for the same samples— respectively—as those of FIGS. 5A and 5B. FIGS. 9 and 10 show the XPS analysis of the N1s line for the samples of FIGS. 6, 7A and 7B.

More specifically, FIGS. 8A and 8B show the compared XPS spectra on Si(p) SiO$_2$/Au mixed surfaces (FIGS. 2A and 2B) in the N1s region of nitrogen. FIG. 8A (first series): 50 scans, $V_{on}$=−0.641 V/(Ag$^+$/Ag), $V_{off}$=−2 400 V/(Ag$^+$/Ag), IR=100Ω; FIG. 8B (second series): 10 scans, $V_{on}$=−0.538 V/(Ag$^+$/Ag), $V_{off}$=−2 600 V/(Ag$^+$/Ag), IR=100Ω, The surfaces are of different origin in each series.

FIG. 9 shows the compared XPS spectra on Si(n) SiO$_2$/Au mixed surfaces (FIGS. 2A and 2B) in the N1s region of nitrogen: 20 scans, $V_{on}$=−0.723 V/(Ag$^+$/Ag), $V_{off}$=−2 400 V/(Ag$^+$/Ag), IR=80 Ω.

Figure 10A:
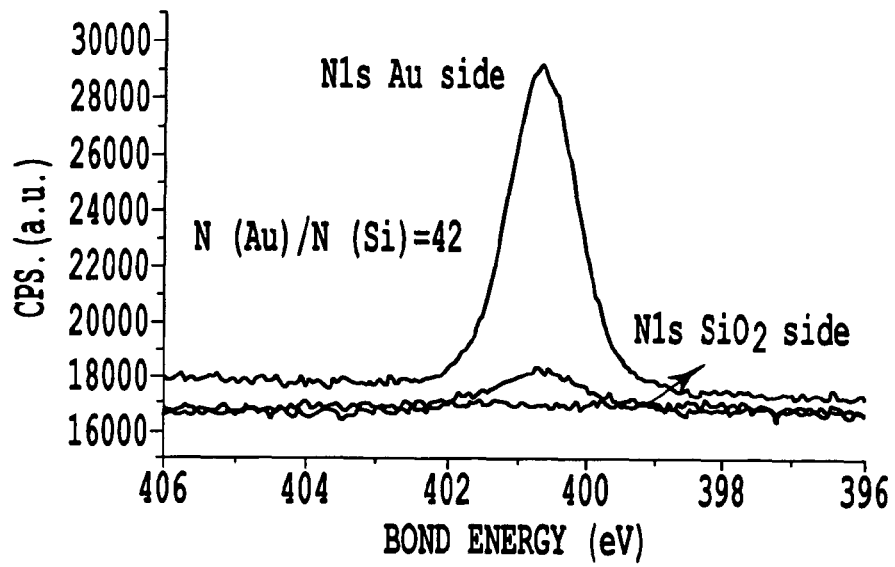
FIGS. 10A and 10B are graphs representing two series of XPS spectra compared on Si/Au mixed surfaces (FIGS. 2A and 2B) in the N1s region of nitrogen.
Figure 10B:
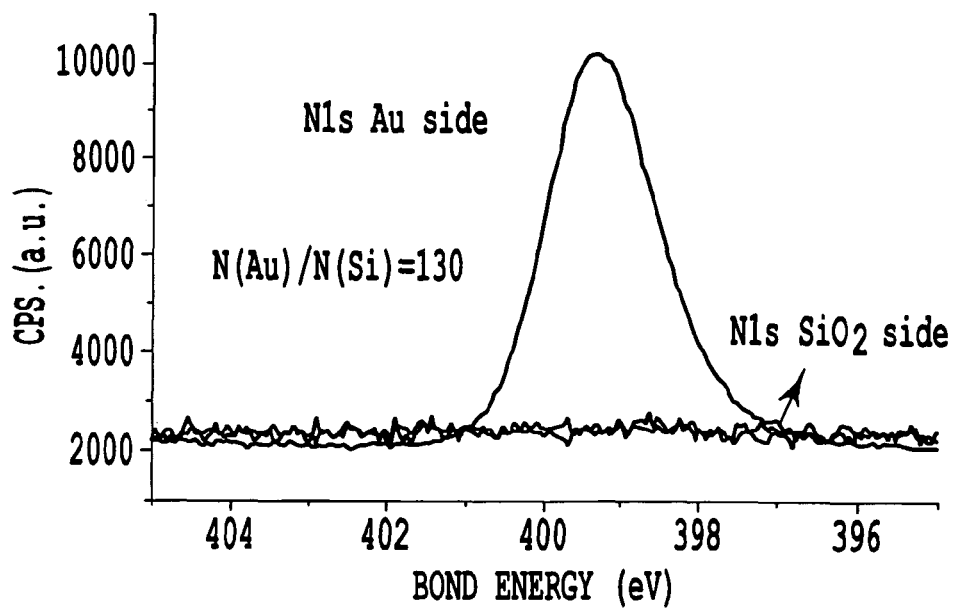

FIGS. 10A and 10B show the compared XPS spectra on Si/Au mixed surfaces (FIGS. 2A and 2B) in the N1s region of nitrogen. FIG. 10A: Si(p), 50 scans, $V_{on}$=−0.599 V/(Ag$^+$/Ag), $V_{off}$=−2 300 V/(Ag$^+$/Ag); FIG. 10B: Si(p), 10 scans, $V_{on}$=−0.747 V/(Ag$^+$/Ag), $V_{off}$=−2 400 V/(Ag$^+$/Ag), IR=70 Ω.

4.3. Results

Table 1 lists the operating conditions and grafting selectivities obtained for the various samples. Except where specifically mentioned, the electrical contact allowing the polarization always takes place on the gold side.

5. Microscope Samples (Interdigitated Combs)

Throughout this series, the polarization is performed with gold (see assembly in FIGS. 3A and 3B). A protocol of 10 voltametric scans up to a return potential of −2.4 V/(Ag$^+$/Ag) was chosen, and an ohmic drop compensation of 100 Ω.

Two types of polarization are applied, making it possible, respectively, to check points (i) and (ii), as mentioned in paragraph 3. above:

(i) the two combs are polarized at the same potential of −2.4 V/(Ag$^+$/Ag) relative to the reference electrode;

(ii) only one of the two combs is set at a potential of −2.4 V/(Ag$^+$/Ag), the other being connected to the reference electrode.

5.1. Uniform Polarization of the Two Combs

Figure 11A:
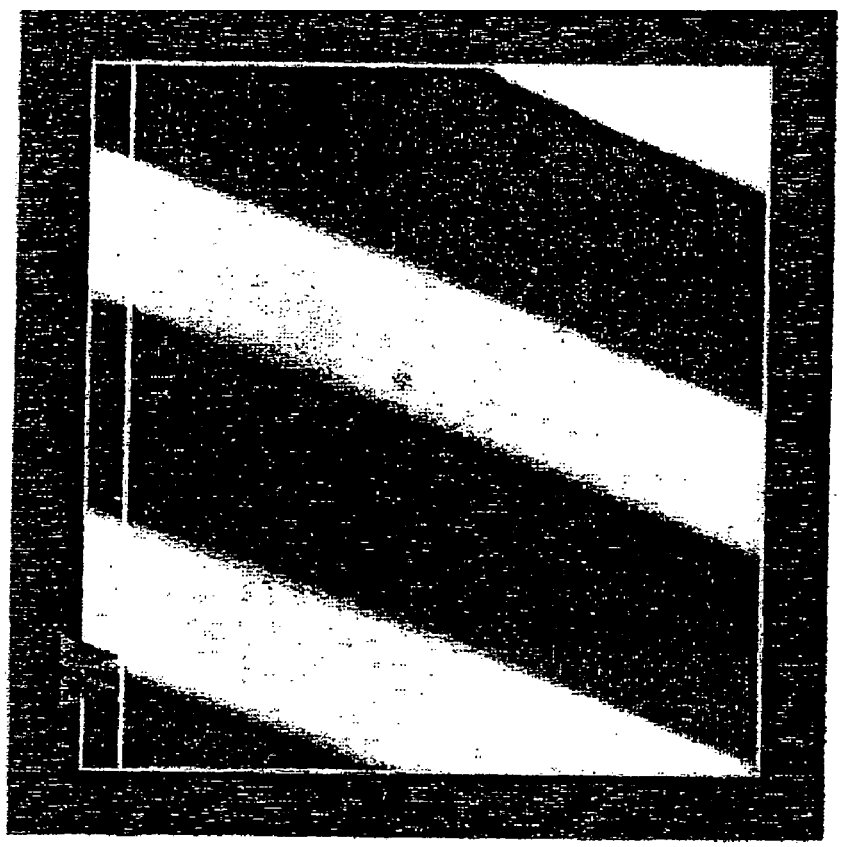
FIGS. 11A and 11B are, respectively, the image and the profilometric analysis by atomic force microscopy (AFM) of the comb of FIGS. 3A and 3B, in which the teeth of the interdigitated combs are spaced at 8 µm.
Figure 11B:
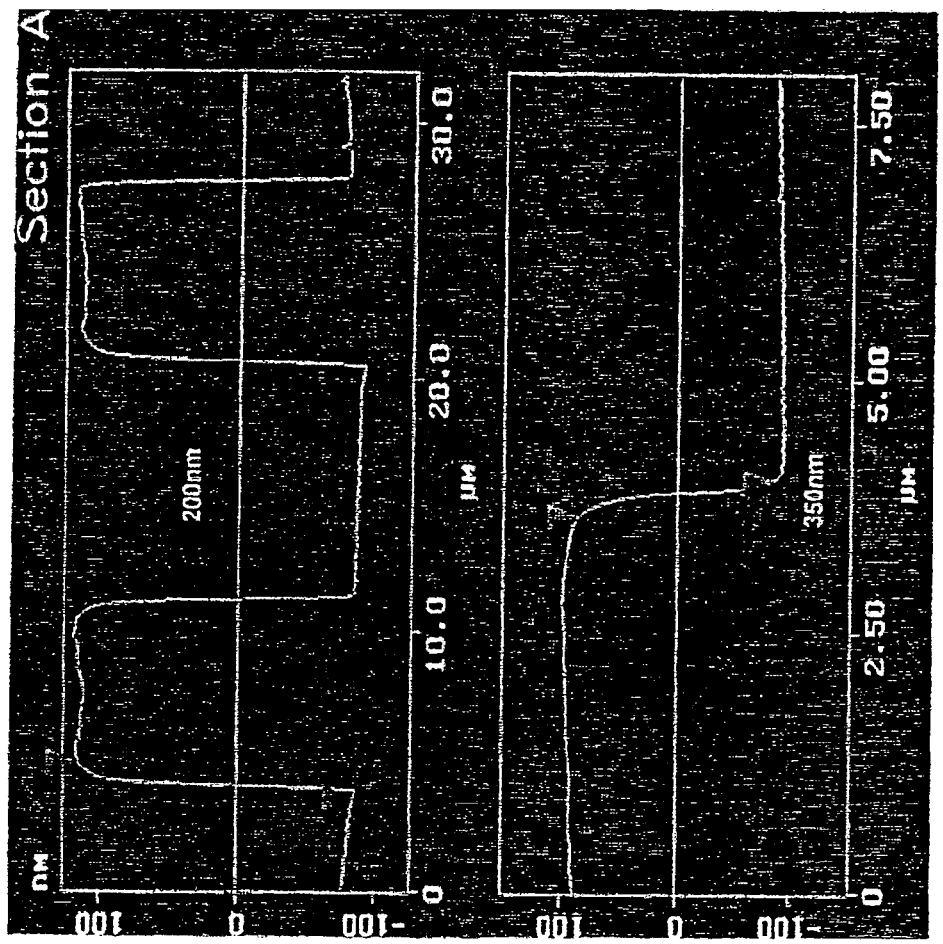

FIGS. 11A and 11B show the profile analysis by AFM of the comb with an 8 μm spacing, in a direction perpendicular to the teeth of the two combs (cf. FIGS. 3A and 3B). It may be observed that there is no flash on the edges of the comb teeth, whereas the teeth heights are 200 nm, i.e. 85 nm higher than those of the combs before grafting (cf. FIGS. 4A to 4C): the protocol has thus allowed the grafting of 85 nm of polymer onto each tooth, with very little lateral flash before the spacing between the teeth of the interdigitated combs. More specifically, FIGS. 11A and 11B show the image (11A) and the profilometric analysis (11B), by atomic force microscopy (AFM), of the comb of FIGS. 3A and 3B, in which the teeth of the interdigitated combs are 8 μm apart, after polarization of the two combs at a potential of −2.4 V/(Ag$^+$/Ag). The height of the comb teeth before polarization is 115 nm.

TABLE I

Operating conditions and grafting selectivity on Au/SiO$_2$ and Au/Si mixed surfaces. The selectivity was measured by XPS, by determining the ratio of the intensities of the N1s lines on each paving. These selectivities are lower limits, the signal on SiO$_2$ or Si usually being nonzero, but rigorously identical to that of the reference sample before grafting. The surfaces are of different origin in each series.

| Sample | N | $V_{on}$ (V/(Ag$^+$/Ag)) | $V_{off}$ (V/(Ag$^+$/Ag)) | IR (Ω) | Thickness (nm) | N(Au)/N(SiX) |
|---|---|---|---|---|---|---|
| Si(p) SiO$_2$/Au | 50 | −0.641 | −2.4 | 100 | 42 | 90 |
| Si(p) SiO$_2$/Au$^{(a)}$ | 50 | −0.644 | −2.4 | 70 | 15 | 56 |
| Si(p) SiO$_2$/Au | 10 | −0.665 | −2.6 | 70 | 28 | 85 |
| Si(p) SiO$_2$/Au | 10 | −0.650 | −2.4 | 52 | 125 | 150 |
| Si(p) SiO$_2$/Au | 10 | −0.538 | −2.6 | 100 | 45 | 140 |
| Si(n) SiO$_2$/Au | 50 | −0.960 | −2.6 | 100 | 5 | 66 |
| Si(n) SiO$_2$/Au | 10 | −0.628 | −2.6 | 100 | 18 | 100 |
| Si(n) SiO$_2$/Au | 20 | −0.723 | −2.4 | 80 | 55 | 80 |
| Si(n) SiO$_2$/Au$^{(a)}$ | 50 | −0.689 | −2.4 | 100 | 48 | 46 |
| Si(n)/Au | 50 | −0.599 | −2.3 | 0 | 8 | 42 |
| Si(n)/Au | 50 | −0.860 | −2.6 | 100 | 5 | 65 |
| Si(n)/Au$^{(b)}$ | 50 | −0.657 | −2.6 | 0 | 38 | 14 |
| Si(p)/Au | 10 | −0.690 | −2.4 | 65 | 100 | 150 |
| Si(p)/Au | 10 | −0.747 | −2.4 | 70 | 40 | 130 |
| Si(p)/Au$^{(b)}$ | 10 | −0.723 | −2.8 | 800 | 4 | 90 |
| Si(p)/Au$^{(b)}$ | 10 | −0.698 | −2.8 | 650 | 10 | 140 |

$^{(a)}$The silica surface was prehydroxylated.
$^{(b)}$The electrical contact was made on the Si portion.

5.2. Polarization of only One of the Two Combs

Figure 12A:
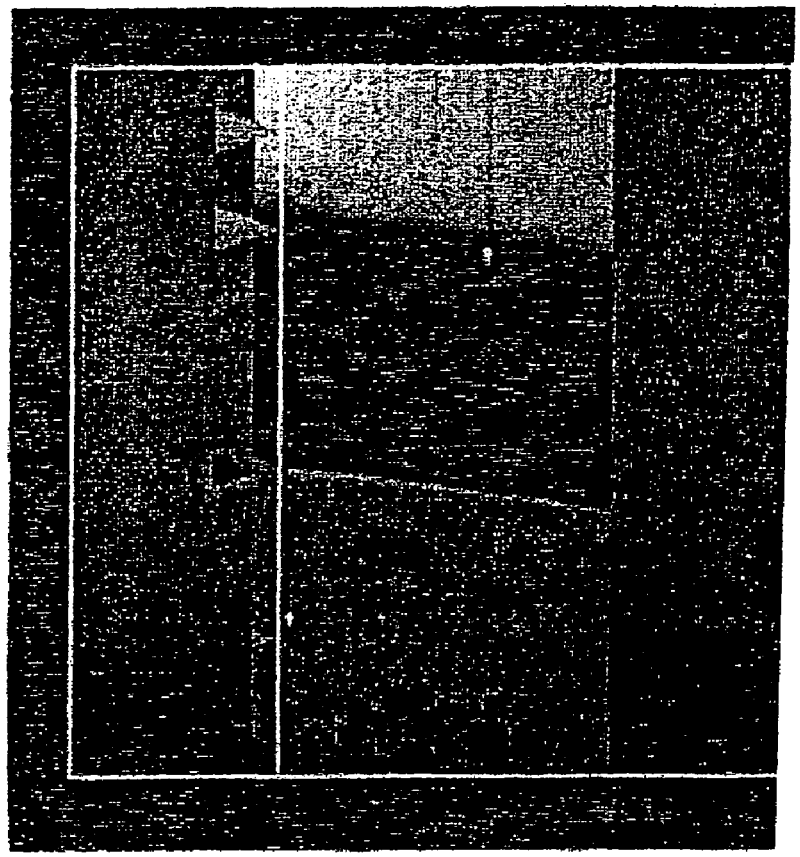
FIGS. 12A and 12B are, respectively, the image and the profilometric analysis by atomic force microscopy (AFM) of the comb of FIGS. 3A and 3B, in which the teeth of the interdigitated combs are spaced at 32 µm.
Figure 12B:
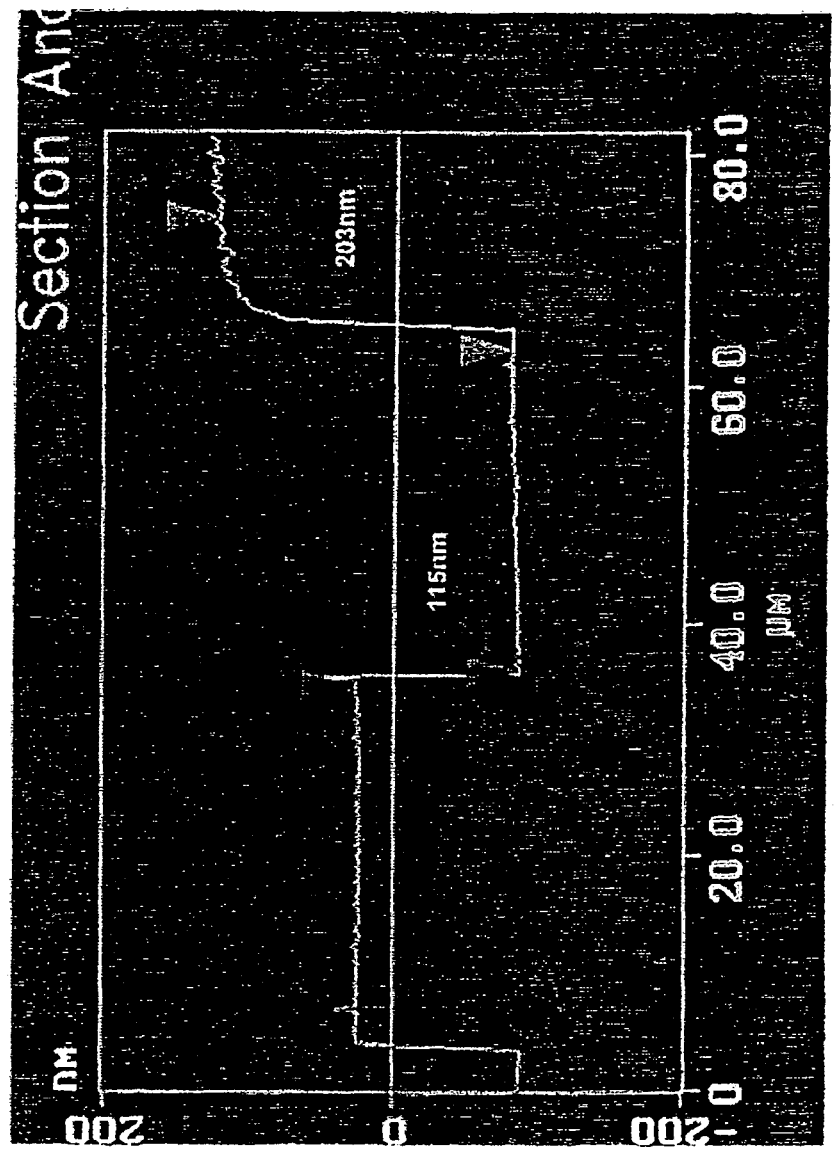

FIGS. 12A and 12B show the profile analysis by AFM of the comb with a 32 μm spacing, in a direction perpendicular to the teeth of the two combs (cf. FIGS. 3A and 3B). The width of the scan makes it possible to observe two successive interdigitated teeth, each belonging to a comb. It is seen that the original height of 115 nm is preserved on the comb connected to the reference electrode, whereas the height of 200 nm (obtained in 5.1.) is obtained on the comb brought to the potential at which grafting takes place: it is observed that the grafting of the polymer has indeed only taken place on every other tooth, i.e. on only one of the two combs. More specifically, FIGS. 12A and 12B generally show the image (12A) and the profilometric analysis (12B), by atomic force microscopy (AFM), of the comb of FIGS. 3A and 3B, in which the teeth of the interdigitated combs are 32 μm apart, after polarization of one of the two combs at a potential of −2.4 V/(Ag$^+$/Ag), the other being connected to the reference electrode. The height of the comb teeth before polarization is 115 nm. This is also the height of the comb which was connected to the reference electrode.

6. Organic Electrografting onto Carbon Nanotubes

The capacities for ultralocalized functionalization afforded by electrografting are illustrated herein. The example described herein relates to the electrografting of vinyl polymers, but is a trivial matter to extend it to a functionalization with the other electro-activatable molecules described in the invention and also in the application examples that follow.

Carbon nanotubes appear to be objects that are potentially very rich in the context of the development of molecular nanotechnologies. Specifically, for electronic applications, nanotubes have insulating, semiconductive or metallic properties. Components such as junctions, or field-effect transistors, have been manufactured. Mechanical applications have also recently been proposed with the use of nanotubes for the production of nanotools.

In the present example, the electrical contact of a carbon nanotube is made as follows: nanotubes are deposited onto the silanized areas of a silicon substrate, and an electrosensitive resin is then coated onto the substrate and the nanotube. The areas corresponding to the electrodes are then opened by electronic lithography, metal electrodes are then evaporated and, finally, the resin and the metal film are lifted off in the places of the resin that have not been opened, according to a protocol described in Choi, K. H., et al., Controlled deposition of carbon nanotubes on a patterned substrate. Surface Science, 2000. 462(1-3): p. 195-202.

The whole substrate assembly is then polarized in the organic medium containing methacrylonitrile or para-nitrophenyldiazonium tetrafluoroborate, according to the same protocols as those in the preceding examples. The functionalization of the nanotube is characterized by AFM and STM, according to the same procedures as those performed in the case of the double comb in the preceding examples.

7. Localized Electrografting using Diazonium Salts

The preceding examples related to the electrografting of vinyl polymers. We present herein an example illustrating the production of localized organic grafting by means of the electroactivation of diazonium salts in organic medium.

The electrografting is performed on the Au/Si(p)O$_2$ macroscopic prongs as described in paragraph 1. of the examples. The electrical contact is made on the gold portion of the prong, and the entire prong is dipped into a solution containing $10^{-3}$ mol/l of para-nitrophenyldiazonium chloride, and $5 \times 10^{-2}$ mol/l of tetraethylammonium perchlorate (TEAP) in acetonitrile. A potential scan is performed, from +0.37 V/(Ag$^+$/Ag) to −2.4 V/(Ag$^+$/Ag), at a scanning speed of 50 mV/s.

Figure 13:
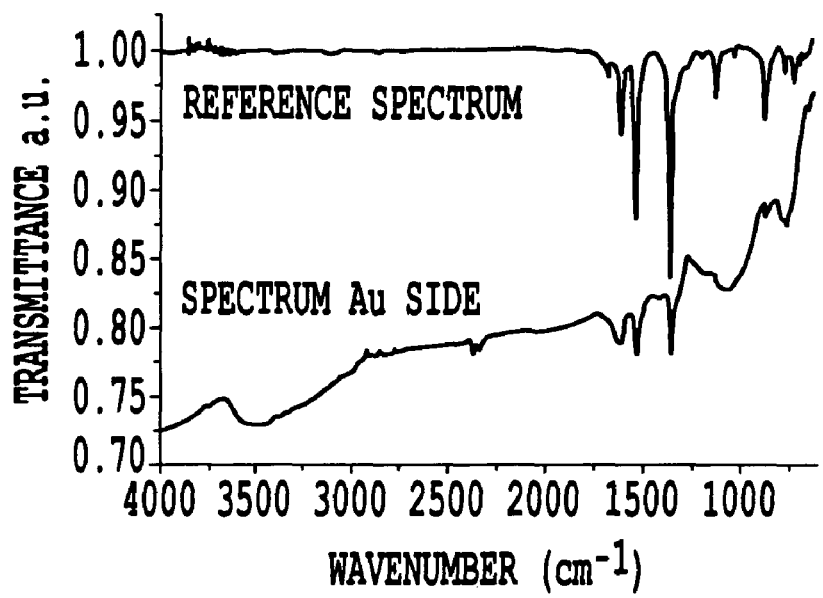
FIG. 13 is a graph representing the IRRAS spectra of a gold-polarized Au/Si(P)$O_2$ composite prong (FIGS. 2A and 2B) in a solution containing para-nitrophenyldiazonium chloride (example 7). The reference spectrum is given at the top and the Au-side spectrum is given at the bottom.
Figure 14:
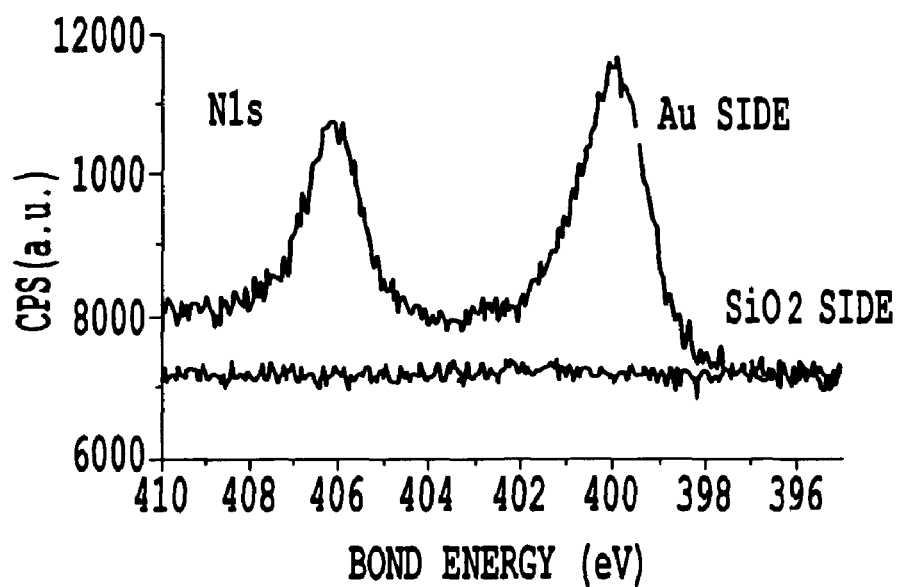
FIG. 14 is a graph representing the N1s region of the XPS spectra of a gold-polarized Au/Si(p)$O_2$ prong (FIGS. 2A and 2B) in a solution containing para-nitrophenyldiazonium tetrafluoroborate on the Au portion (top spectra) and on the $SiO_2$ portion (bottom spectra).

The two portions of the surface are then analyzed by IRRAS spectroscopy (FIG. 13) and by XPS (FIG. 14). It is clearly observed, as in the case of the electrografting of vinyl polymers, that the organic grafting has taken place only on the gold and not on the SiO$_2$ portion.

More specifically, FIG. 13 shows the IRRAS spectra of an Au/Si(P)O$_2$ composite prong (cf. paragraph 1. of the examples and FIGS. 2A and 2B) polarized with gold in a solution containing para-nitrophenyldiazonium chloride. The characteristic lines of the nitro group at about 1 500 cm$^{-1}$ are clearly distinguished.

FIG. 14 shows the N1s region of the XPS spectra of an Au/Si(p)O$_2$ prong (cf. paragraph 1. of the examples and FIGS. 2A and 2B) polarized with gold in a solution containing para-nitrophenyldiazonium tetrafluoroborate, on the Au portion (top spectra) and on the SiO$_2$ portion (bottom spectrum).

8. Localized Electrografting using Aryl Acetates

We present herein an example illustrating the production of localized organic grafting by means of the electroactivation of aryl acetates in organic medium.

The electrografting is performed on the Au/Si(p)O$_2$ macroscopic prongs as described in paragraph 1. (FIGS. 2A and 2B). The electrical contact is made on the gold portion of the prong, and the entire prong is dipped into a solution containing $4 \times 10^{-3}$ mol/l of phenyl acetate, and 0.1 mol/l of (n-Bu)$_4$PF$_6$ in acetonitrile. 10 to-and-fro potential scans are performed, from +0.5 V/SCE to +1.25 V/SCE, at a scanning speed of 200 mV/s, The surfaces are characterized as in the preceding example, and selective grafting onto the gold is again obtained.

The disclosures of the priority documents International Application No. PCT/FR02/00726 filed Feb. 28, 2002, and French Application No. FR 01/02882 filed Mar. 2, 2001, are incorporated by reference herein in their entireties.

REFERENCES

1—WO-A-99/24868.
2—WO-A-98/58745.
3—FR-A-2 787 581 and FR-A-2 787 582.
4—WO-A-99/38612.
5—WO-A-96/29629.
6, a—G. DENIAU, G. LECAYON, P. VIEL, G. HENNICO, J. DELHALLE, Langmuir, 8 (1992) 267.
6, b—E. LEONARD-STIBBE, G. LECAYON, G. DENIAU, P. VIEL, M. DEFRANCESCHI, G. LEGEAY, J. DELHALLE, Journal of Polymer Science A, 32 (1994) 1551.
7, a—C. BUREAU, G. DENIAU, P. VIEL, G. LECAYON and J. DELHALLE, Journal of Adhesion, 58 (1998) 101.
7, b—C. BUREAU and G. LECAYON, Journal of Chemical Physics, 106 (1997) 8 821.
8—C. BUREAU and J. DELHALLE, Journal of Surface Analysis, 6 (1999) 159.
9—G. DENIAU, P. VIEL and G. LECAYON, Surface and Interface Analysis, 18 (1992) 443.
10, a—P. JONNARD, F. VERGAND, P. F. STAUB, C. BONNELLE, G. DENIAU, C. BUREAU, G. LECAYON, Surface and Interface Analysis, 24 (1996) 339.
10, b—G. TOURILLON, R. GARRETT, N. LAZARZ, M. RAYNAUD, C. REYNAUD, G. LECAYON, P. VIEL, Journal of the Electrochemical Society, 137 (1990) 2 499.
11—P. VIEL, C. BUREAU and G. LECAYON, Journal of Electroanalytical Chemistry, 470 (1999) 14.
12—C. BUREAU, Doctoral Thesis, University of Paris VI (1994).
16—G. DENIAU, G. LECAYON, P. VIEL, G. ZALCZER, C. BOIZIAU, G. HENNICO and J. DELHALLE, Journal of the Chemical Society, Perkin Transactions, 2 (1990) 1 433.
17—C. LEBRUN, G. DENIAU, P. VIEL, G. LECAYON, Surface Coatings Technology, 100-101 (1998) 474.
18—C. BUREAU, G. DENIAU, P. VIEL and G. LECAYON, Macromolecules, 30 (1997) 333.
19—C. BUREAU, Journal of Electroanalytical Chemistry, 479 (1999) 43.
21—C. C. YEN, Journal of Applied Polymer Science, 60 (1996) 605.

The invention claimed is:

1. A process for mask-free localized grafting of organic molecules, which are capable of being electrically activated, onto a composite surface comprising conductive and/or semiconductive areas that are materials of different nature, the process comprising placing said organic molecules in contact with said conductive and/or semiconductive areas of said composite surface; and electrochemically grafting an insulating film of said organic molecules on chosen, defined areas of said conductive and/or semiconductive areas by bringing said chosen, defined areas to a potential higher than or equal to a threshold electrical potential, which is determined relative to a reference electrode, and above which grafting of said organic molecules takes place, wherein the grafting is conducted without a mask.

2. The process as claimed in claim 1, in which the composite surface comprises materials the nature of which differs in at least one of electronic work function under vacuum, surface solvation with an electrolysis solvent, and Brönsted activity in the electrolysis solvent.

3. The process as claimed in claim 1, in which the composite surface comprises a semiconductive surface.

4. The process as claimed in claim 1, in which the composite surface comprises a silicon surface onto which is deposited another semiconductor.

5. The process as claimed in claim 1, in which the composite surface comprises a surface comprising a semiconductor and a metal.

6. The process as claimed in claim 1, in which the composite surface comprises a surface comprising two different metals.

7. The process as claimed in claim 1, in which the composite surface comprises a surface obtained by effecting contact between a conductive or semiconductive object and a conductive or semiconductive surface.

8. The process as claimed in claim 7, wherein the object is a nanoobject.

9. The process as claimed in claim 8, wherein the nanoobject is a nanotube.

10. The process as claimed in claim 1, in which said composite surface comprises a surface comprising silicon and gold or a surface comprising silicon dioxide and gold.

11. The process as claimed in claim 1, in which said organic molecules include electrocleavable molecules.

12. The process as claimed in claim 11, in which
said electrocleavable molecules are chosen from diazonium salts, phosphonium salts, sulfonium salts, carboxylic acid salts, aryl acetates, aliphatic alcohols and amines.

13. The process as claimed in claim 11, in which
said organic molecules include electrograftable molecules chosen from
vinyl monomers of formula B—R-A, in which R is a group bearing a vinyl double bond, A is an electron-withdrawing or electron-donating functional group, and B is any functional group;
molecules comprising at least one strained ring;
functionalized monomers derived from said vinyl monomers and said molecules comprising at least one strained ring; and
mixtures of said vinyl monomers and said molecules comprising at least one strained ring.

14. The process as claimed in claim 13, in which each of said vinyl monomers is selected from the group consisting of acrylonitrile, methacrylonitrile, para-chlorostyrene, 4-vinylpyridine, alkyl methacrylates, and cyano acrylates.

15. The process as claimed in claim 13, in which each of said vinyl monomers is selected from the group consisting of 4-vinylpyridine and N-vinyl-pyrrolidone.

16. The process as claimed in claim 13, in which said molecules comprising at least one strained ring comprise a molecule which may be opened by nucleophilic or electrophilic attack.

17. The process as claimed in claim 1, in which the insulating film of said organic molecules is subsequently functionalized or modified to change the chemical, physical, optical or magnetic properties of the film.

18. The process as claimed in claim 17, in which the insulating film of said organic molecules is a film of electrografted polyacrylonitrile which is subsequently cured and made electrically conductive.

19. The process as claimed in claim 17, in which the insulating film of said organic molecules is subsequently doped with silver salts.

20. The process as claimed in claim 1, in which
said organic molecule is methacrylonitrile and
the grafting is performed by using a potential scan over said surface with a threshold potential from $-2.3$ to $-2.8$ $V/(Ag^+/Ag)$.

21. The process as claimed in claim 1, in which the composite surface is chosen from
the surfaces of microelectronic circuits, and
the surfaces of microfluidics devices, of micromechanical components and of fine jewelry components.

22. The process as claimed in claim 1, wherein the conductive and/or semiconductive areas of the composite surface differ in at least one of electronic work function under vacuum, surface solvation with an electrolysis solvent, and Brönsted activity in the electrolysis solvent.

23. The process as claimed in claim 1, wherein the conductive and/or semiconductive areas of the composite surface are co-planar.

24. A process for mask-free localized grafting of organic molecules, which are capable of being electrically activated, onto a composite surface comprising conductive and/or semiconductive areas that are materials of different nature, the process comprising
placing said organic molecules in contact with said conductive and/or semiconductive areas of said composite surface; and
electrochemically grafting an insulating film of said organic molecules on chosen, defined areas of said conductive and/or semiconductive areas by bringing said chosen, defined areas to a potential higher than or equal to a threshold electrical potential, which is determined relative to a reference electrode, and above which grafting of said organic molecules takes place, wherein
the grafting is conducted without a mask
the composite surface is formed by a polycrystalline material; and
each of the conductive and/or semiconductive areas of the composite surface is a face of a different monocrystal of the polycrystalline material.

\* \* \* \* \*